United States Patent [19]

Ohyama

[11] Patent Number: 5,764,385
[45] Date of Patent: Jun. 9, 1998

[54] IMAGE INPUT APPARATUS TO INPUT AN IMAGE OF A DOCUMENT ON AN ORIGINAL MOUNT

[75] Inventor: Atsushi Ohyama, Yokohama, Japan

[73] Assignee: Canon Kabushiki Kaisha, Japan

[21] Appl. No.: 819,136

[22] Filed: Mar. 17, 1997

Related U.S. Application Data

[63] Continuation of Ser. No. 320,546, Oct. 11, 1994.

[30] Foreign Application Priority Data

Oct. 15, 1993 [JP] Japan ................................. 5-282057

[51] Int. Cl.[6] ........................................................ H04N 1/04
[52] U.S. Cl. ......................... 358/498; 358/496; 399/373
[58] Field of Search .................................. 358/471, 474, 358/494, 496–498; 399/367–373, 375, 377–380, 384; H04N 1/04

[56] References Cited

U.S. PATENT DOCUMENTS

| | | |
|---|---|---|
| 4,764,815 | 8/1988 | Landsman . |
| 4,774,542 | 9/1988 | Kondo ................................. 355/232 |
| 4,792,858 | 12/1988 | Landsman . |
| 4,831,455 | 5/1989 | Ishikawa et al. ...................... 358/471 |
| 5,143,363 | 9/1992 | Irie et al. ............................. 355/320 |
| 5,296,908 | 3/1994 | Hatano et al. ........................ 355/320 |
| 5,331,435 | 7/1994 | Scott ................................... 348/218 |
| 5,339,173 | 8/1994 | Jinnai .................................. 358/471 |
| 5,579,083 | 11/1996 | Naito et al. . |

*Primary Examiner*—Kim Yen Vu
*Attorney, Agent, or Firm*—Fitzpatrick, Cella, Harper & Scinto

[57] ABSTRACT

An image input apparatus includes an original mount for setting an original having an image surface to be input, an input unit, disposed at a position facing the original mount, for inputting the image surface of the original on the original mount, an original-moving unit for moving the original set an the original mount on a plane, and a moving unit for moving the input unit in a direction crossing the moving direction of the original on the plane.

17 Claims, 21 Drawing Sheets

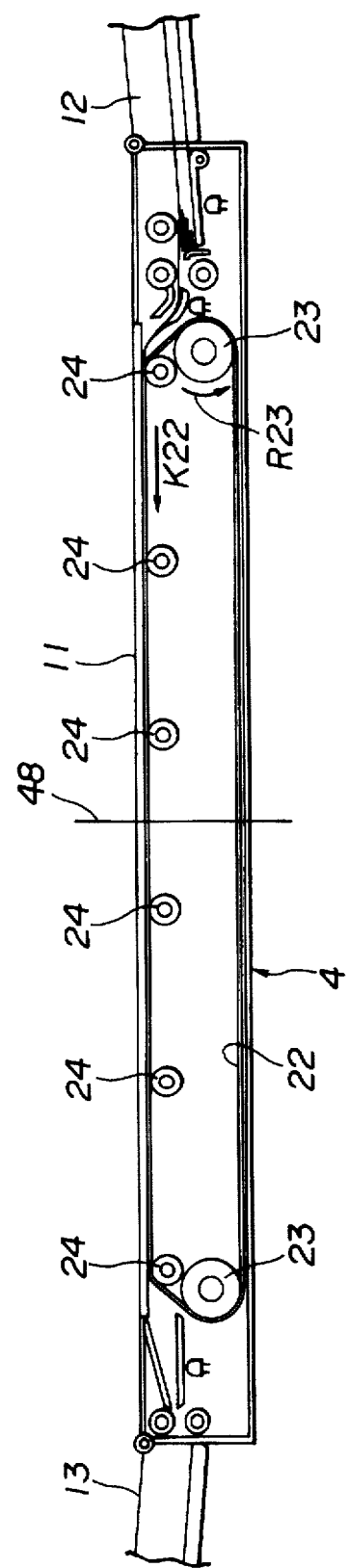

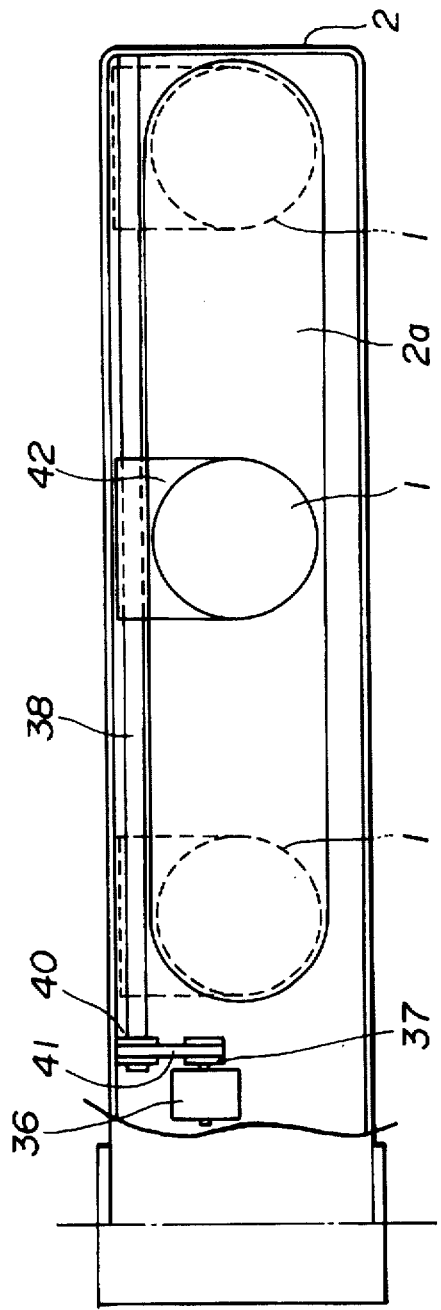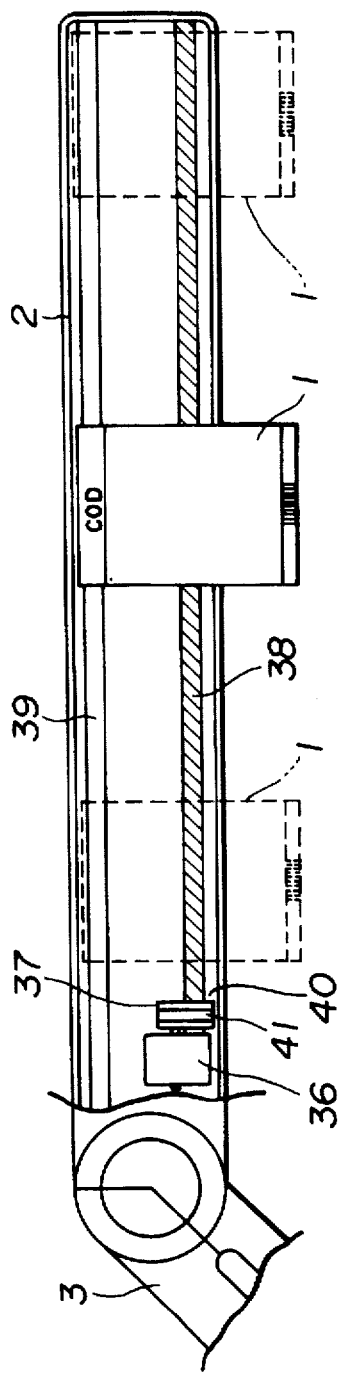

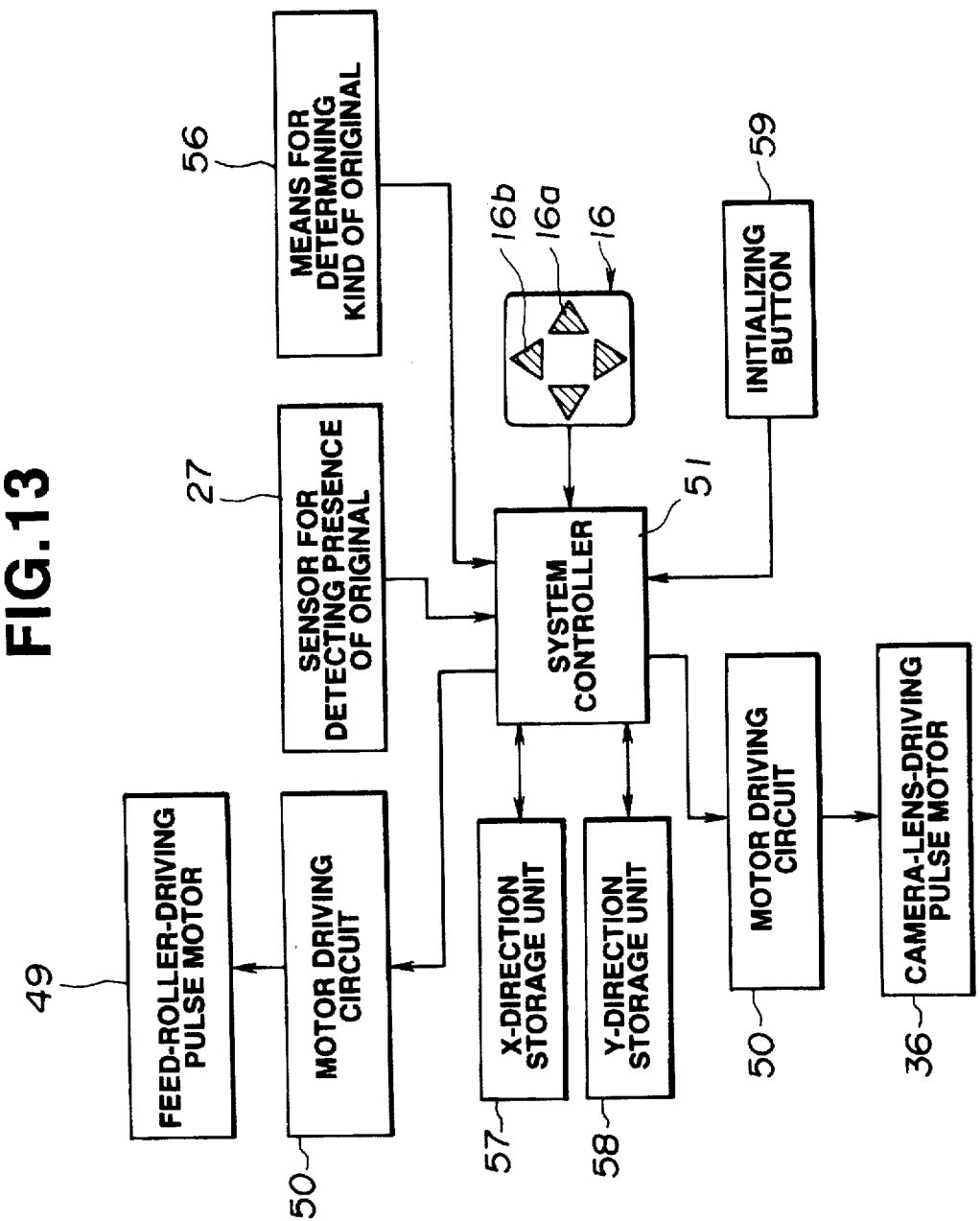

IMAGE INPUT APPARATUS TO INPUT AN IMAGE OF A DOCUMENT ON AN ORIGINAL MOUNT

This application is a continuation of application Ser. No. 08/320,546 filed Oct. 11, 1994.

BACKGROUND OF THE INVENTION

1. Field of the Invention

This invention relates to an image input apparatus, and more particularly, to an image input apparatus for displaying an input object, in particular, an original set on an original mount, on the picture surface of a monitor. For example, an overhead projector for projecting an input object onto a screen may correspond to such an image input apparatus. In this case, the screen corresponds to the monitor.

2. Description of the Related Art

FIG. 22 is a perspective view illustrating an outline of a conventional image input apparatus.

In FIG. 22, an original-mounting surface 101, on which an original D is mounted in a state of placing its image surface to be input upward, is formed on the upper surface of an original mount 100. An operation panel 102, on which a power-supply switch 103 and the like are arranged, is provided at one side of the original mount 100. A frame 104 is erected at another side of the original mount 100. A lens 105 is disposed downward at the distal end of the frame 104. The lens 105 is mounted so that its optical axis 106 passes through substantially the center of the original D set at a predetermined position of the original-mounting surface 101. A video monitor 107 is connected to the original mount 100, so that the image of the original D input via the lens 105 is displayed on a display unit 108.

A description will now be provided of operation procedures when imaging the original D. By turning on the power-supply switch 103, the original D can be imaged. At that time, white balance is automatically provided, the lens 105 is focused on the original mount 100, and the angle of view of the lens 105 is set to a wide side.

Thereafter, the operator places the original D on a substantially central portion of the original-mounting surface 101. Thus, the image of the original D mounted on the original mount 100 is displayed on the display unit 108 of the video monitor 107. At that time, the operator arranges the position and the angle of the original D by moving it so that the image of the mounted original D is positioned at a substantially central portion of the display unit 108 in an erect state.

In addition, the operator adjusts, whenever necessary, the size (the angle of view) of the image of the original D displayed on the display unit 108 by operating a zoom button provided on a portion of the operation panel 102. An autofocusing button, a manual focusing button and the like are also provided on the operation panel 102, so that the original D can be focused whenever necessary.

However, the above-described conventional approach has the following problems.

As shown in FIG. 22, when explaining a plurality of originals D in a meeting or the like, a group $D_0$ of sequentially arranged originals is generally provided in the vicinity of the apparatus. The first original D is mounted on the original mount 100, and the contents of the original D are explained while displaying the image of the original D on the display unit 108 of the video monitor 107. Upon the completion of the explanation, the original D is removed from the original mount 100 and is moved to another place. The next original D to be explained is then taken out of the group $D_0$ of originals and is mounted on the original-mounting surface 101 of the original mount 100. In such a series of image input operations, the following problems arise.

(1) Since each original D is manually removed and replaced, troublesome operations must be performed.

(2) While removing and replacing originals, the arranged group $D_0$ of originals and a group $D_0$ of explained originals are often disordered and mixed, thereby causing the problem that the next original to be mounted on the original mount 100 becomes uncertain. In addition, the disordered originals interrupt the flow of the presentation.

(3) When an explained original D is again needed, time is required for searching for the original D.

When it is intended to display a portion of the original D while magnifying that portion, the original must be moved depending on the portion. For example, when magnifying a portion A of the original D shown in FIG. 22, the operator must move the original D so that the portion A comes on the optical axis 106 of the lens 105, as shown in FIG. 23. In such an operation, the following problems arise.

(4) Since the original D is manually moved, a troublesome operation must be performed.

(5) Particularly, when the original D is moved to the position shown in FIG. 23, a part of the operation panel 102 is hidden, thereby causing an inferior operability of the apparatus.

SUMMARY OF THE INVENTION

It is an object of the present invention to provide an image input apparatus having excellent operability in which the above-described problems are solved.

According to one aspect, the present invention, which achieves the above-described object, relates to an image input apparatus comprising an original mount for setting an original having an image surface to be input, input means, disposed at a position facing the original mount, for inputting the image surface of the original on the original mount, original-moving means for moving the original set on the original mount on a plane, and moving means for moving the input means in a direction substantially orthogonal to the direction of motion of the original on the plane.

In one embodiment, the apparatus further comprises a sheet-feeding tray and a sheet-discharging tray disposed at two sides of the original mount in the moving direction of the original set on the original mount, sheet-feeding means for sequentially feeding a plurality of originals mounted on the sheet-feeding tray to the original mount, and sheet-discharging means for sequentially discharging the originals on the original mount onto the sheet-discharging tray.

In another embodiment, the sheet-discharging means comprises a reverse sheet-feeding mechanism for supplying the originals on the sheet-discharging tray toward the original mount, and the sheet-feeding means comprises a reverse sheet-discharging mechanism for discharging the originals on the original mount onto the sheet-feeding tray.

In still another embodiment, the apparatus further comprises sheet-number counting means for counting the number of fed originals, and original-assigning means for assigning a predetermined original from the plurality of originals. The predetermined original is selected and set on the original mount.

In yet another embodiment, the sheet-feeding tray and the sheet-discharging tray are disposed rotatably with respect to the original mount so as to assume released positions, provided at two sides of the original mount, and locking positions, covering the original mount from above. An original-mounting surface facing the input means is formed at the upper surfaces of the sheet-feeding tray and the sheet-discharging tray disposed at the locking positions.

According to the above-described configuration, the original first set on the original mount is one-dimensionally moved by the original moving means, and the input means is then moved in a direction crossing the moving direction by the moving means. That is, by combining the above-described moving operations, the input means can be subjected to two-dimensional movement relative to the image surface of the original, so that the input means can make an arbitrary region on the image surface an imaging range.

When the sheet-feeding means and the sheet-discharging means are provided, it is possible to automatically supply an original from the sheet-feeding tray to the original mount, and to automatically discharge the original on the original mount onto the sheet-discharging tray.

When the reverse sheet-feeding mechanism and the reverse sheet-discharging mechanism are provided in the sheet-discharging means and the sheet-feeding means, respectively, it is possible to feed an original discharged on the sheet-discharging tray again onto the original mount, and to discharge the original on the original mount onto the sheet-feeding tray.

When the sheet-number counting means and the original-assigning means are provided, the sheet-number counting means can always detect the serial number of the original currently supplied onto the original mount. Hence, for example, if the original-assigning means assigns an original to be set on the original mount, it is possible to automatically select the original, and to set the original on the original mount by the sheet-feeding means and the sheet-discharging means.

If the sheet-feeding tray and the sheet-discharging tray are rotatably disposed and the original-mounting surface is formed, it is possible to utilize the original-mounting surface facing the input means as an original-mounting surface (S2) for manually inserting an original, when, for example, the sheet-feeding means and the sheet-discharging means are not used.

According to another aspect, the present invention relates to an imaging/displaying apparatus comprising an image input apparatus. The image input apparatus includes an original mount for setting an original having an image surface to be input, a camera head, disposed at a position facing the original mount, for inputting the image surface of the original on the original mount, original moving means for moving the original set on the original mount on a plane, and moving means for moving the camera head in a direction crossing the moving direction of the original on the plane, and a video monitor for displaying image information from the image input apparatus on a display unit.

As described above, the present invention has the following advantages.

By providing the original-feeding means, a removing/replacing operation of an original when explaining a plurality of originals can be automatically performed, so that explanation can be efficiently performed.

By automatically changing the imaging range of an original, efficiency in explanation is improved without degrading the operability of the apparatus.

By arranging so that an original can be fed in two directions, an explained original can be easily searched for even if it is needed again.

By counting the number of fed originals, it is possible to instantaneously provide an assigned original, thereby improving the operability of the apparatus.

By providing the trays, a plurality of originals can be accommodated in the sheet-feeding tray and the sheet-discharging tray. Hence, sequentially arranged originals will not be disordered, thereby preventing visual awkwardness.

BRIEF DESCRIPTION OF THE DRAWINGS

FIG. 10 is a vertical cross-sectional view illustrating an original-feeding operation;

FIG. 12(a) is a horizontal cross-sectional view illustrating the configuration of camera-head driving means;

FIG. 12(b) is a vertical cross-sectional view illustrating the configuration of the camera-head driving means;

FIG. 13 is a block diagram illustrating an imaging-position-changing operation;

DESCRIPTION OF THE PREFERRED EMBODIMENTS

A description will now be provided of embodiments of the present invention with reference to the drawings.
First Embodiment FIG. 1 is a perspective view illustrating an outline of an image input apparatus according to a first embodiment of the present invention.

Figure 1:
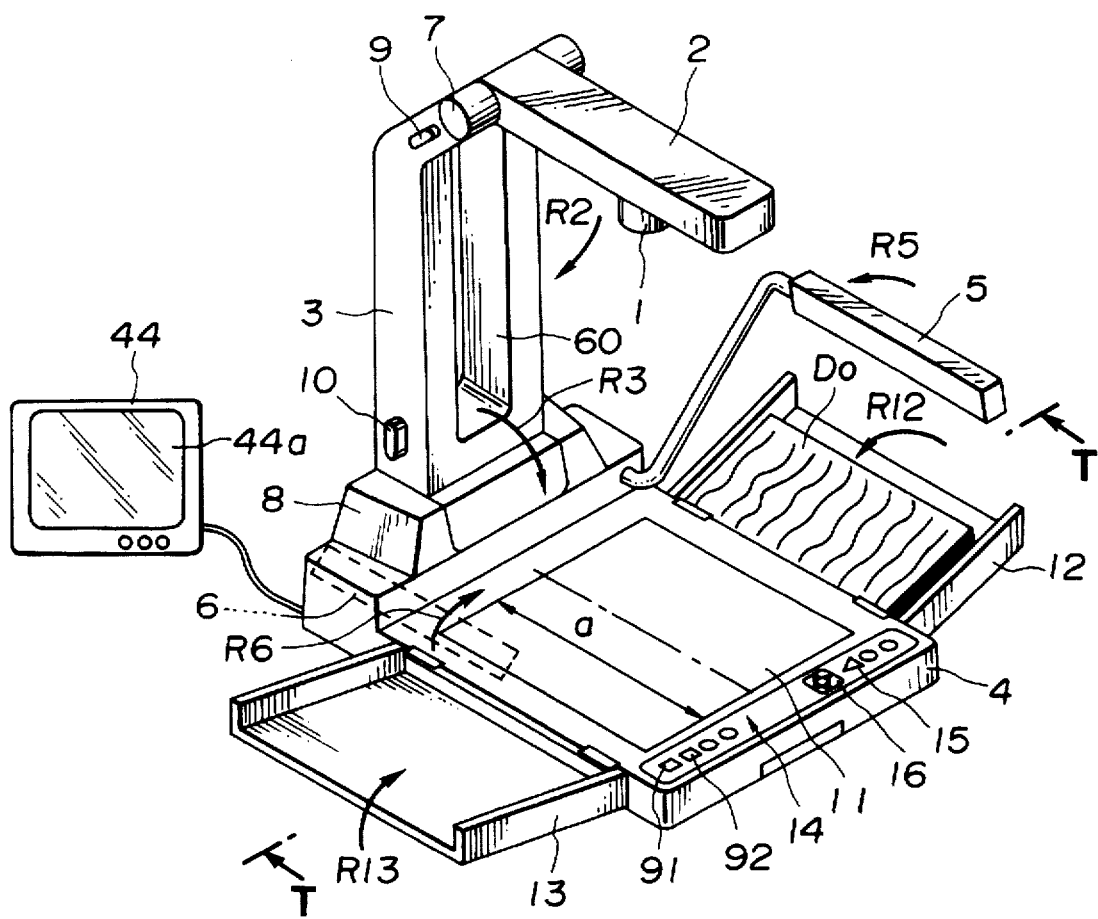
FIG. 1 is a perspective view illustrating an outline of an image input apparatus according to a first embodiment of the present invention.

In FIG. 1, the image input apparatus includes a camera lens 1, an arm 2, a post 3, an original mount 4, illuminating devices 5 and 6 (indicated by broken lines).

The camera lens 1 is movably supported by the arm 2, and is moved by lens-driving means (camera-moving means, to be described later) within a predetermined range in a one-dimensional direction along the longitudinal direction of the arm 2. The camera lens 1 is connected to a reading circuit (CCD (charge-coupled device)) for converting an image into an electrical signal, and is also connected to output means for outputting the signal.

The arm 2 is pivoted around a fulcrum 7 on the post 3 so as to be rotatable within a predetermined range (in the direction of arrow R2), and is locked at an accommodated position folded within the post 3 (see FIG. 2), and at an imaging position set substantially orthogonally to the post 3 (see FIG. 1).

Figure 2:
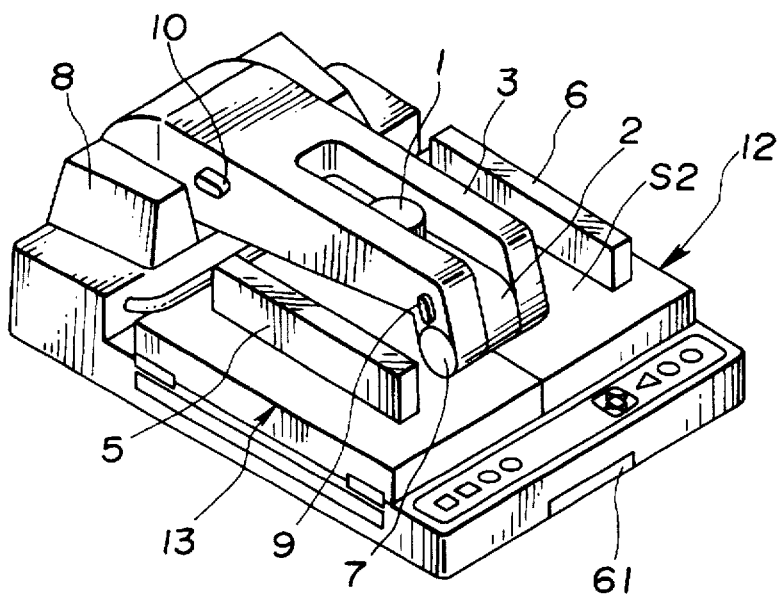
FIG. 2 is a perspective view illustrating an accommodated state of the image input apparatus shown in FIG. 1.

The post 3 is pivoted around a fulcrum 8 on the original mount 4 so as to be rotatable within a predetermined range (the direction of arrow R3), and is locked at an accommodated position, in which the post 3 is folded on a sheet-feeding tray 12 and a sheet-discharging tray 13 (to be described later) in an unused state (a locked state), as shown in FIG. 2, and at an imaging position, in which the post 3 is erected substantially orthogonally to the original mount 4 (see FIG. 1).

An arm release button 9 for releasing the locked state of the arm 2 is provided in the vicinity of the fulcrum 7, and a post release button 10 for releasing the locked state of the post 3 is provided in the vicinity of the fulcrum 8.

Glass 11 is disposed on the upper surface of the original mount 4. The glass 11 is mounted so as to be detachable relative to the original mount 4, and so that the upper surface of the glass 11 has substantially the same height as the upper surface of the original mount 4. This surface is termed a first object-mounting surface, on which an object, such as an original or the like, may be directly mounted. The size of the glass 11 is formed so as to be greater than the imaging range at the wide end of the camera lens 1. More specifically, both the longitudinal and lateral sides of the glass 11 are set to a length "a" which is greater than the longer side of an A4-size original (297 mm). In order to prevent the reflection of fluorescent lamps and the like, nonreflective glass is preferably used for the glass 11.

The sheet-feeding tray 12 and the sheet-discharging tray 13 are mounted at a pair of facing sides of the original mount 4. These trays 12 and 13 are supported on the original mount 4 via supporting means so as to be rotatable within a predetermined range (in the directions of arrows R12 and R13 shown in FIG. 1, respectively) between used positions (released states shown in FIG. 1) and unused positions (locked states shown in FIG. 3). As shown in FIG. 4, the sheet-feeding tray 12 and the sheet-discharging tray 13 are set inclined at a predetermined angle θ with respect to the original mount 4 at the used positions.

As shown in FIG. 1, an operation panel 14 is provided at a front portion of the original mount 4. A power-supply switch 91 for the main body of the apparatus and a switch 92 for the illuminating devices are provided so as to be adjacent to each other on a portion of the operation panel 14. The operation panel 14 also includes buttons for controlling the camera lens 1, such as a zooming button, a focusing button and the like. The operation panel 14 further includes an original-feeding button 15, an imaging-position-changing button 16 and the like (to be described later).

Each of the illuminating devices 5 and 6 is pivoted on the original mount 4 so as to be rotatable within a predetermined range, and includes a free stop mechanism for stopping the device at an arbitrary angle within the rotatable range.

In FIG. 1, reference numeral 44 represents a video monitor connected to the image input apparatus having the above-described configuration. An object, such as an original or the like, converted into an electrical signal is displayed on a display unit 44a of the video monitor 44. A symbol $D_0$ represents a plurality of originals set on the sheet-feeding tray 12 when using original-feeding means (to be described later). The following description will be provided illustrating an original having an image surface as an object whose image is to be input. A group of originals is represented by $D_0$, and a single original is represented by D.

Figure 3:
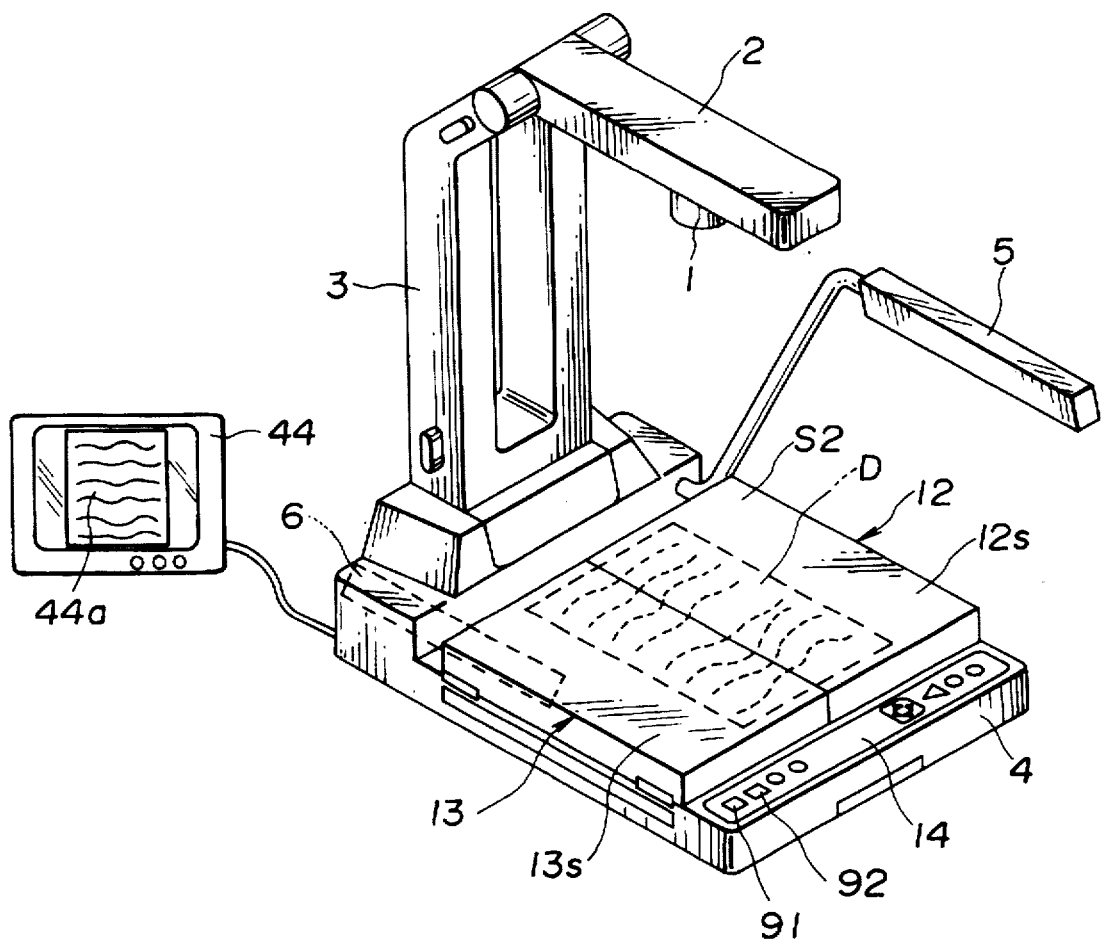
FIG. 3 is a perspective view illustrating image input utilizing a sheet-feeding tray and a sheet-discharging tray shown in FIG. 1 as an origin-al-mounting surface.
Figure 4:
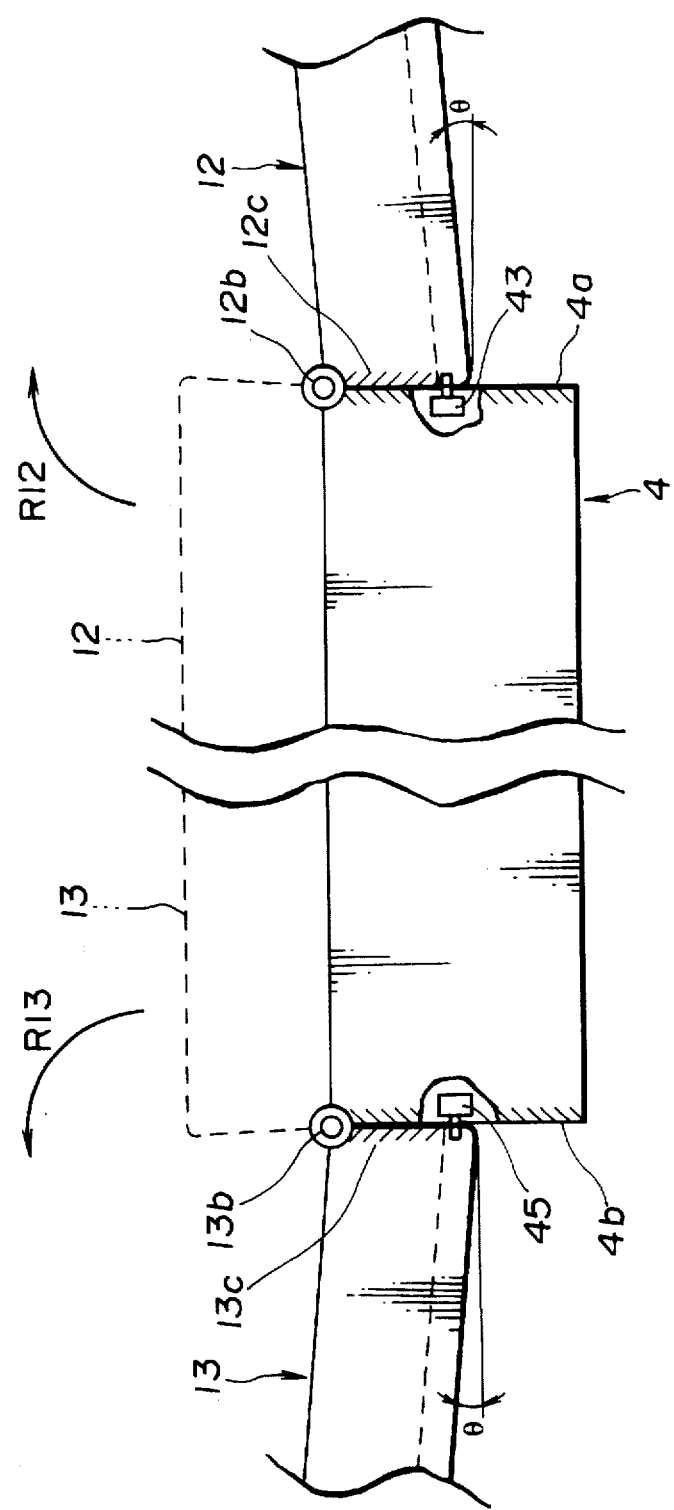
FIG. 4 is an enlarged side view illustrating operations of rotating the sheet-feeding tray and the sheet-discharging tray.

Next, a description will be provided of imaging operation procedures when the original-feeding means is not used, with reference to FIG. 3.

First, the arm 2 and the post 3 are locked at the imaging positions shown in FIG. 3. Then, the illuminating devices 5 and 6 are set to the positions shown in FIG. 3. In this state, the sheet-feeding tray 12 and the sheet-discharging tray 13 assume the unused positions, in which they are folded on the original mount 4. At that time, the backs 12s and 13s of the sheet-feeding tray 12 and the sheet-discharging tray 13, respectively, are placed horizontally on substantially the same plane. When the original-feeding means is not used, the backs 12s and 13s of the sheet-feeding tray 12 and the sheet-discharging tray 13, respectively, constitute a mounting surface for an original D. The combination of the backs 12s and 13s is termed a second object-mounting surface (original-mounting surface) S2. The sheet-feeding tray 12 and the sheet-discharging tray 13 also have a function of protecting the glass 11 from contamination, scratches and the like in a folded and closed state.

By switching on the power-supply switch 91 on the operation panel 14, the original D can be imaged. At that time, white balance is automatically provided, the camera lens 1 is focused on the second object-mounting surface S2, and the angle of view of the camera lens 1 is set to a wide side, as will be described later. Thus, the original D mounted on the second object-mounting surface S2 is displayed on the display unit 44a of the monitor 44. At that time, the operator adjusts the position and the angle of the original D relative to the second object-mounting surface S2 so that the mounted original D is placed at a substantially central portion of the display unit 44a of the monitor 44.

The operator also adjusts, whenever necessary, the size (the angle of view) of the original D displayed on the display unit 44a by operating the zoom button provided on the operation panel 14. The original D can be focused, whenever necessary, by operating an autofocusing button or a manual focusing button. If light sources in the vicinity of the main body of the apparatus are weak, and therefore the original D displayed on the monitor 44 is difficult to observe, the insufficient amount of light is supplemented by lighting the illuminating devices 5 and 6 by switching on the illumination switch 92.

Next, a description will be provided of preparation when inputting images of a plurality of documents D, with reference to FIGS. 4 through 7.

In FIG. 4, the sheet-feeding tray 12 is rotated around a hinge 12b in the direction of arrow R12. Similarly, the sheet-discharging tray 13 is rotated around a hinge 13b in the direction of arrow R13. A stop side 12c of the rotated sheet-feeding tray 12 contacts a side 4a of the original mount 4, to prevent further rotation of the sheet-feeding tray 12 in the direction of arrow R12, and the sheet-feeding tray 12 is set with a predetermined inclination relative to the original mount 4. At that time, a microswitch 43 provided at the side 4a is switched on, to detect the setting of the sheet-feeding tray 12. Similarly, a stop side 13c of the rotated sheet-discharging tray 13 contacts another side 4b of the original mount 4, to prevent further rotation of the sheet-discharging tray 13 in the direction of arrow R13, and the sheet-discharging tray 13 is set with a predetermined inclination relative to the original mount 4. At that time, a microswitch 45 provided at the side 4b of the original mount 4 is switched on, to detect the setting of the sheet-discharging tray 13. In order to prevent a misoperation, an operation relating to the original-feeding means (to be described later) cannot be performed unless the microswitches 43 and 45 are switched on.

Figure 5:
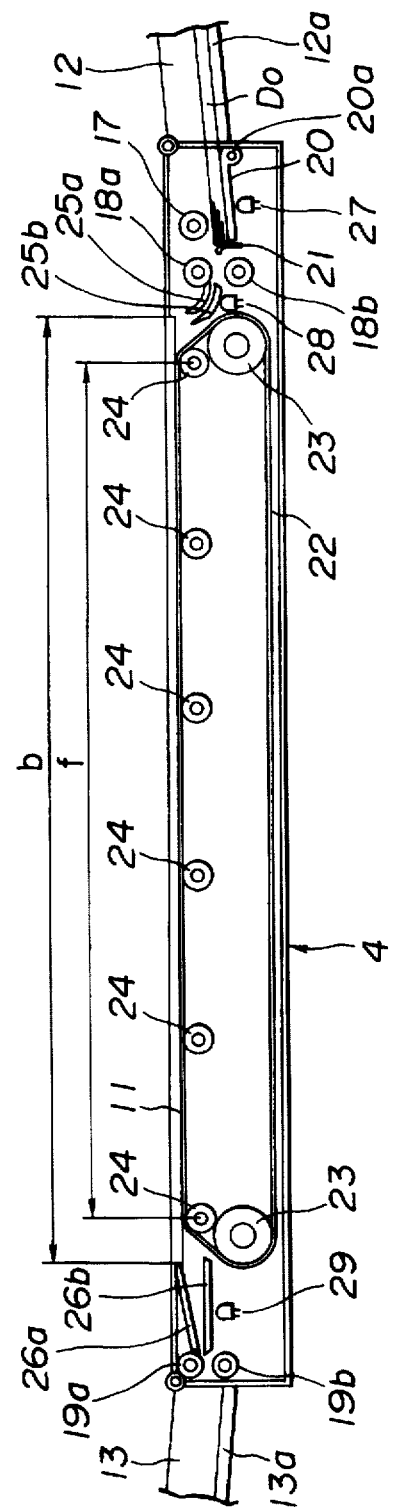
FIG. 5 is a vertical cross-sectional view illustrating the configuration of original-feeding means.
Figure 6:
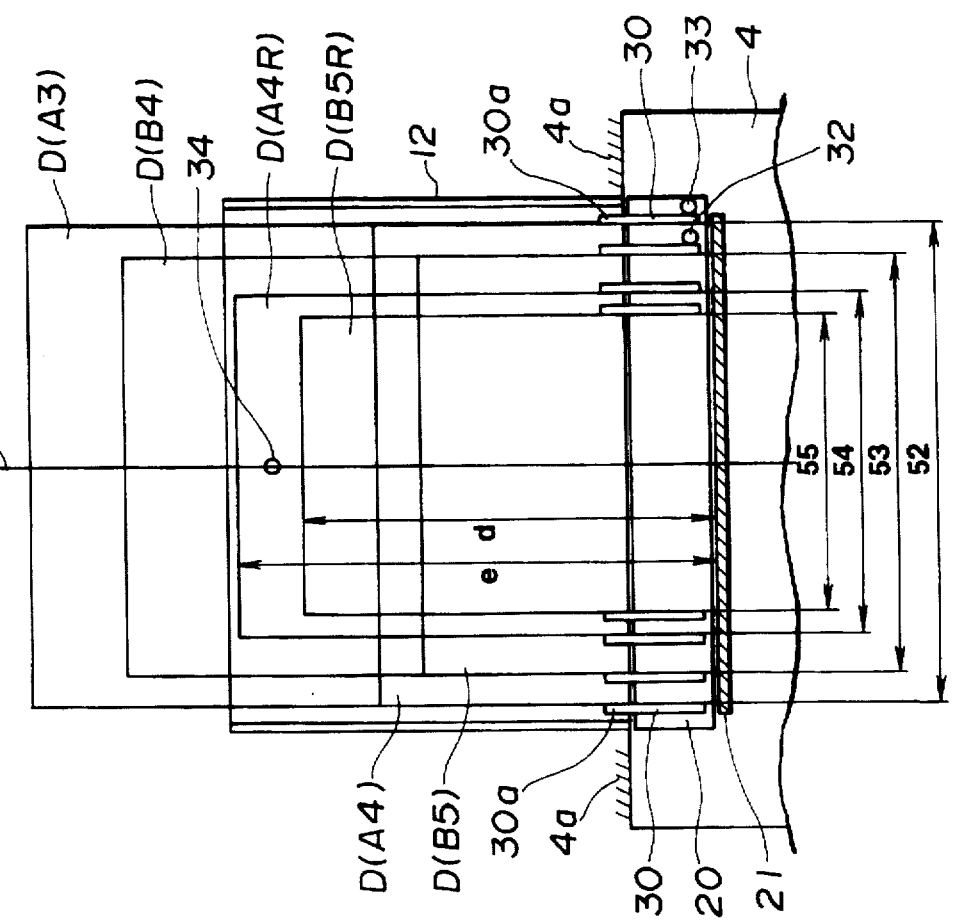
FIG. 6(a) is a diagram illustrating means for determining the kind of an original.
FIG. 6(b) is a diagram illustrating an example of detection of sensors for determining the kind of an original.

Next, the configuration of the original-feeding means will be described with reference to FIG. 5. FIG. 5 is a schematic diagram as seen from line T—T shown in FIG. 1. The original-feeding means is provided within the original mount 4.

The original-feeding means includes sheet-feeding means, comprising a sheet-feeding roller 17, a conveying roller 18a, a retard roller 18b and the like, at the side of the sheet-feeding tray 12 (the right side in FIG. 5), and sheet-discharging means, comprising a sheet-discharging roller 19a, a sheet-discharging driven roller 19b and the like, at the side of the sheet-discharging tray 13 (the left side in FIG. 5). These rollers are rotatably supported on the main body of the apparatus. The retard roller 18b and the sheet-discharging driven roller 19b are contactable/separable relative to the conveying roller 18a and the sheet-discharging roller 19a, respectively. Usually, as shown in FIG. 5, the retard roller 18b and the sheet-discharging driven roller 19b are in a separated state with predetermined gaps.

A pickup guide 20 and a stopper 21 are disposed immediately below the sheet-feeding roller 17. The pickup guide 20 is pivoted around a guide shaft 20a so as to be rotatable within a predetermined range. Usually, the pickup guide 20 has substantially the same inclination as that of the sheet-feeding tray 12 being set, and the upper surface of the pickup guide 20 is situated on substantially the same plane as a base 12a of the sheet-feeding tray 12. The stopper 21 is fixed in the vicinity of the swinging end of the pickup guide 20. A plurality of originals $D_0$ mounted on the sheet-feeding tray 12 are aligned in the feeding direction by the contact of their distal ends with the stopper 21.

Original-moving means, comprising a feed belt 22, a pair of feed rollers 23, a plurality of pinch rollers 24 and the like, is disposed immediately below the glass 11 on the upper surface of the original mount 4. An endless belt, white or having a color close to white, is used as the feed belt 22. The width (depth) of the feed belt 22 is set to the same length as, or to a length more or less shorter than, the width "a" of the glass 11 (shown in FIG. 1). The feed belt 22 is stretched between the pair of feed rollers 23 with the aid of the plurality of pinch rollers 24. By driving the pinch rollers 24 upward against the glass 11 with a predetermined force, the feed belt 22 contacts the lower surface of the glass 11 within the range of the length f between the axes of the pinch rollers 24 at two ends. The length f between the axes of the pinch rollers 24 at the two ends is set to be smaller than the length b of the glass 11 in the direction of the arrangement of the pinch rollers 24. Sheet-feeding guides 25a and 25b, a sensor 27 for detecting the presence of an original, and a fed-sheet sensor 28 are provided between the sheet-feeding tray 12 and the upstream side of the feed belt 22. Sheet-discharging guides 26a and 26b, and a discharged-sheet sensor 29 are provided between the sheet-discharging tray 13 and the downstream side of the feed belt 22. The sheet-feeding guides 25a and 25b, and the sheet-discharging guides 26a and 26b constitute a conveying path of the original D. The sensor 27 detects the presence of an original, and the fed-sheet sensor 28 and the discharged-sheet sensor 29 detect a fed state of the original D.

Next, a description will be provided of means for determining the kind of the original D to be fed, with reference to FIGS. 6(a) and 6(b). In the present apparatus, the kind of the original D is determined by setting the original D on the sheet-feeding tray 12. In the following description, it is assumed that the original D fed in the present apparatus belongs to one of six kinds, i.e., A4, A3, A4R, B4, B5 and B5R sizes. A pair of plates 30 for regulating the width of the original are provided so as to be movable within a predetermined range on the upper surface of the pickup guide 20. An operation unit 30a, which protrudes from the side 4a of the original mount 4 by a predetermined length, is formed on a portion of each of the width-regulating plates 30, so that the operator can change the positions of the width-regulating plates 30 by operating the operation units 30a. The original D in the present apparatus is fed by making its center a reference position. By regulating two sides of the original D by the pair of width-regulating plates 30, the center of the set original D substantially coincides with the center 31 of the sheet-feeding tray 12. By moving one of the width-regulating plates 30 by moving means, the two width-regulating plates 30 move the same distance in opposite directions. The width-regulating plates 30 have four kinds of regulating positions, i.e., A4/A3 positions (52), BE/B4 positions (53), A4R positions (54) and B5R positions (55). Lightly supporting means (locking means) are provided at the respective positions.

The kind of the mounted original D is determined by detecting the positions of the width-regulating plates 30, and the length of the original D. A first sensor 32 and a second sensor 33 are disposed in the vicinity of one of the width-regulating plates 30. The first sensor 32 and the second sensor 33 detect the B5/B4 position 53 of the width-regulating plate 30, and the A4/A3 position 52 of the width-regulating plate 30, respectively. A third sensor 34 is provided on the central axis 31 of the sheet-feeding tray 12 at a position longer than the length d of the B5R format and shorter than the length e of the A4R format in a state, in which the leading edge of the original D contacts the stopper 21. Each of these sensors comprises a usual sensor of a light-projecting/sensing type. However, any other sensors may also be used.

FIG. 6(b) illustrates specific states of the detection of the sensors. For example, it can be understood that when an original D having the A4 size is set, the second sensor 33 is turned on, and the width-regulating plates 30 assume the A4/A3 positions 52. The length of the original D is confirmed by the on/off state of the third sensor 34. Since the third sensor 34 is turned off, it is determined that the set original D has the A4 size. The positions of the sensors are not limited to the above-described positions. For example, the kind of the original D may be determined by detecting only the length of the original D.

Figure 7:
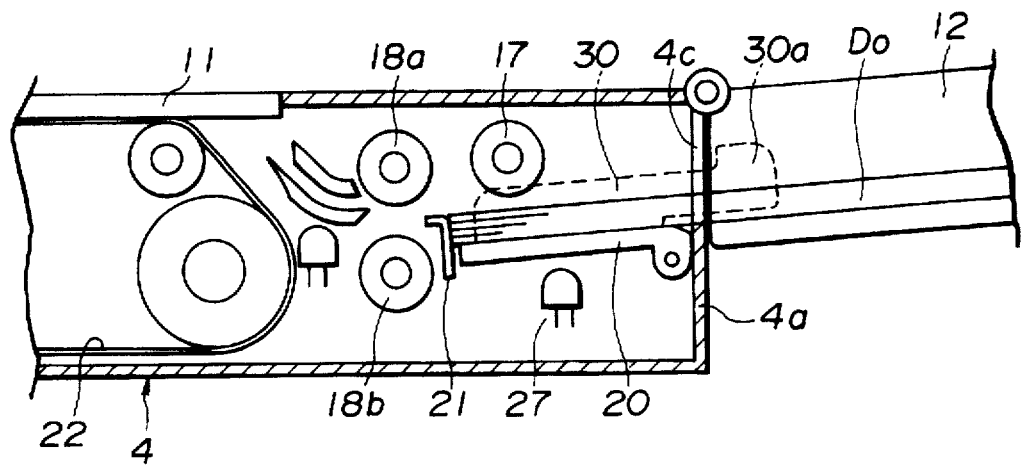
FIG. 7 is a vertical cross-sectional view illustrating a state in which a plurality of originals are mounted on the sheet-feeding tray.

Next, a description will be provided of a case in which a plurality of originals Do are set, with reference to FIG. 7. A description will be provided illustrating the A4 size, which is most frequently used, as the kind of the originals $D_0$.

First, the positions of the width-regulating plates 30 provided on the pickup guide 20 are adjusted in accordance with the kind of the set originals $D_0$ by operating the operation units 30a.

Next, the plurality of originals $D_0$ are set in the sheet-feeding tray 12. At that time, the leading edges of the originals $D_0$ pass through a sheet-feeding opening 4c formed at the side 4a of the original mount 4, and are inserted into the original mount 4. Then, the originals $D_0$ move along the pickup guide 20, and the leading edges of the originals $D_0$ contact the stopper 21. The plurality of originals $D_0$ are thereby aligned with respect to the direction of insertion. At that time, the sensor 27 for detecting the presence of an original detects that the originals $D_0$ are present on the sheet-feeding tray 12. The above-described means for determining the kind of the original detects the kind of the set originals $D_0$. (In the present case, information indicating the A4 size is detected.) Next, a description will be provided of an original-feeding operation with reference to FIGS. 5, 8, 9 and 10.

As shown in FIG. 5, when the feeding means is in an initial state, the sheet-feeding roller 17 is separated from the uppermost sheet of the plurality of originals $D_0$ by a predetermined gap. The retard roller 18b and the sheet-discharging driven roller 19b are also separated from the conveying roller 18a and the sheet-discharging roller 19a with predetermined gaps, respectively.

By operating the original-feeding button 15 provided on the operation panel 14 on the original mount 4, a sheet-discharging operation is first performed. When an original D has already been fed, the original D is discharged onto the sheet-discharging tray 13.

Figure 8:
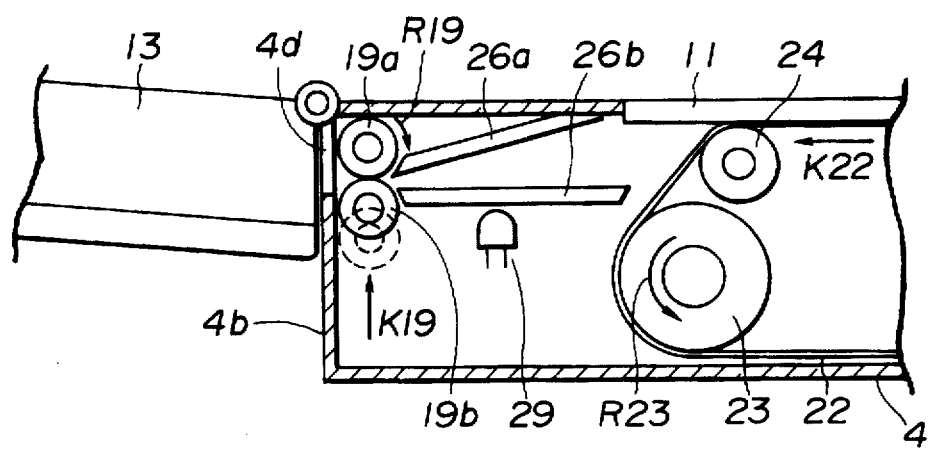
FIG. 8 is an enlarged vertical cross-sectional view illustrating a sheet-discharging operation.

As shown in FIG. 8, the sheet-discharging driven roller 19b is moved by driving means, such as a plunger or the like, in the direction of arrow K19 to be in pressure contact with the sheet-discharging roller 19a, and the sheet-discharging roller 19a rotates in the direction of arrow R19. At that time, the sheet-discharging driven roller 19b is driven by the rotation of the sheet-discharging roller 19a. The pair of feed rollers 23 are rotated in the direction of arrow R23 by driving means, such as a motor or the like. The feed belt 22 is thereby moved in the direction of arrow K22. At that time, if an original D is present, the original D is conveyed in the direction of arrow K22 in accordance with the movement of the feed belt 22 in that direction.

The original D is conveyed along the conveying path formed by the sheet-discharging guides 26a and 26b, and is grasped between the sheet-discharging roller 19a and the sheet-discharging driven roller 19b. Since the rotational speed of the sheet-discharging roller 19a is set to be higher than the rotational speed of the feed belt 22, the original D is conveyed while being pulled with a force of a certain degree, so that bending of the original D is prevented. When the trailing edge of the original D is detected by the discharged-sheet sensor 29, the driving of the feed roller 23 is stopped, and after the lapse of a predetermined time period, the rotation of the sheet-discharging roller 19a is also stopped. The sheet-discharging driven roller 19b returns to the initial separated state. At that time, the trailing edge of the original D is completely separated from the sheet-discharging roller 19a and the sheet-discharging driven roller 19b, and is accommodated on the sheet-discharging tray 13. When the discharged-sheet sensor 29 does not detect the original D even after the lapse of a predetermined time period after the pair of feed rollers 23 have been driven, it is determined that the original D is absent. The operation is stopped at that time, and the process proceeds to the next operation.

Figure 9:
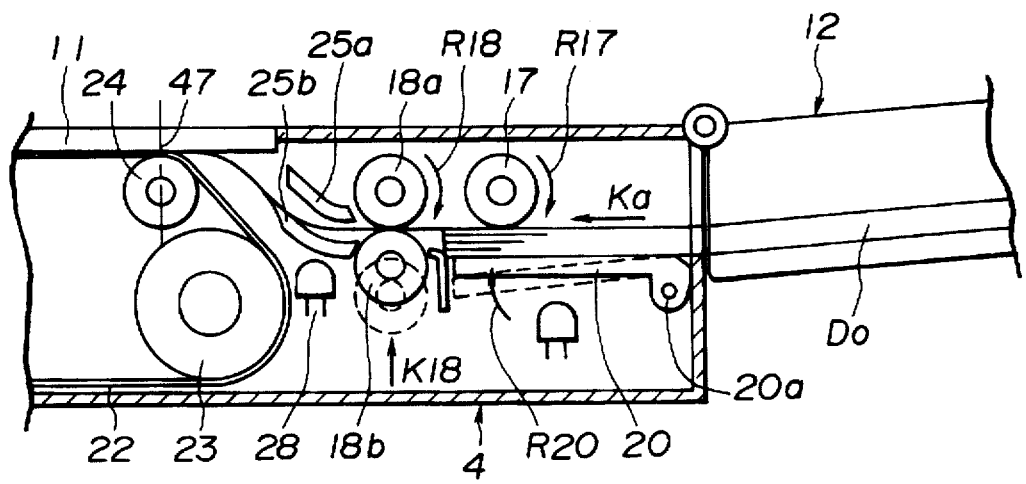
FIG. 9 is an enlarged vertical cross-sectional view illustrating a sheet-feeding operation.

Next a sheet-feeding operation is started. After the sheet-discharging operation has been completed, as shown in FIG. 9, the retard roller 18b is moved in the direction of arrow K18 by driving means, such as a plunger or the like, to be in pressure contact with the conveying roller 18a. Thereafter, the pickup guide 20 is rotated around the guide shaft 20a in the direction of arrow R20 by driving means, such as a plunger or the like. The uppermost sheet of the plurality of originals $D_0$, which have been set, is thereby in pressure contact with the sheet-feeding roller 17 with a predetermined force. Then, the sheet-feeding roller 17 starts to rotate in the direction of arrow R17. At the same time, the conveying roller 18a starts to rotate in the direction of arrow R18, whereby the retard roller 18b starts to rotate. The uppermost sheet of the plurality of originals $D_0$ is thereby conveyed in the direction of arrow Ka. By passing through the conveying roller 18a and the retard roller 18b, the uppermost sheet is separated from the plurality of originals $D_0$, and is conveyed in the direction of arrow Ka. Since the above-described separation operation is known and is not related to the gist of the present invention, a detailed description thereof will be omitted.

The separated original D is further conveyed along the conveying path formed by the sheet-feeding guides 25a and 25b in the direction of arrow Ka. Thereafter, the leading end of the conveyed original D is detected by the fed-sheet sensor 28. The pickup guide 20 rotates around the guide shaft 20a in a direction opposite to the direction of arrow R20, and returns to the initial state. In this state, the original D is conveyed while being grasped between the conveying roller 18a and the retard roller 18b. After the lapse of a predetermined time period after the fed-sheet sensor 28 has detected the leading edge of the original D, the drive of the sheet-feeding roller 17 and the conveying roller 18a is stopped, so that the conveyance of the original D is stopped. At that time, the leading edge of the original D reaches a contact end portion 47 between the feed belt 22 and the glass 11 at the sheet-feeding side, and the original D stops while providing a certain amount of loop (deflection curve). The leading edge of the original D is driven toward the contact end portion 47 between the feed belt 22 and the glass 11 with a predetermined force due to the stiffness of the sheet. Thus, the registration of the original D with respect to the conveying direction is performed, so that oblique conveyance is prevented.

Thereafter, as shown in FIG. 10, the pair of feed rollers 23 are rotated in the direction of arrow R23 by driving means, such as a pulse motor or the like. The feed belt 22 is thereby moved in the direction of arrow K22. At that time, the plurality of pinch rollers 24 are rotatably driven in pressure contact with the conveying surface (lower surface) of the glass 11 with a predetermined force. The original D is conveyed in accordance with the movement of the feed belt 22 while being grasped between the glass 11 and the feed belt 22. This is caused by a difference between coefficients of friction. That is, the coefficient of friction between the original D and the glass 11 is set to be greater than the coefficient of friction between the original D and the feed belt 22. After the lapse of a predetermined time period after the pair of feed rollers 23 have started to rotate, the retard roller 18b is separated from the conveying roller 18a to return to the initial state. Thus, the original D is conveyed only by the feed belt 22.

Figure 11A:
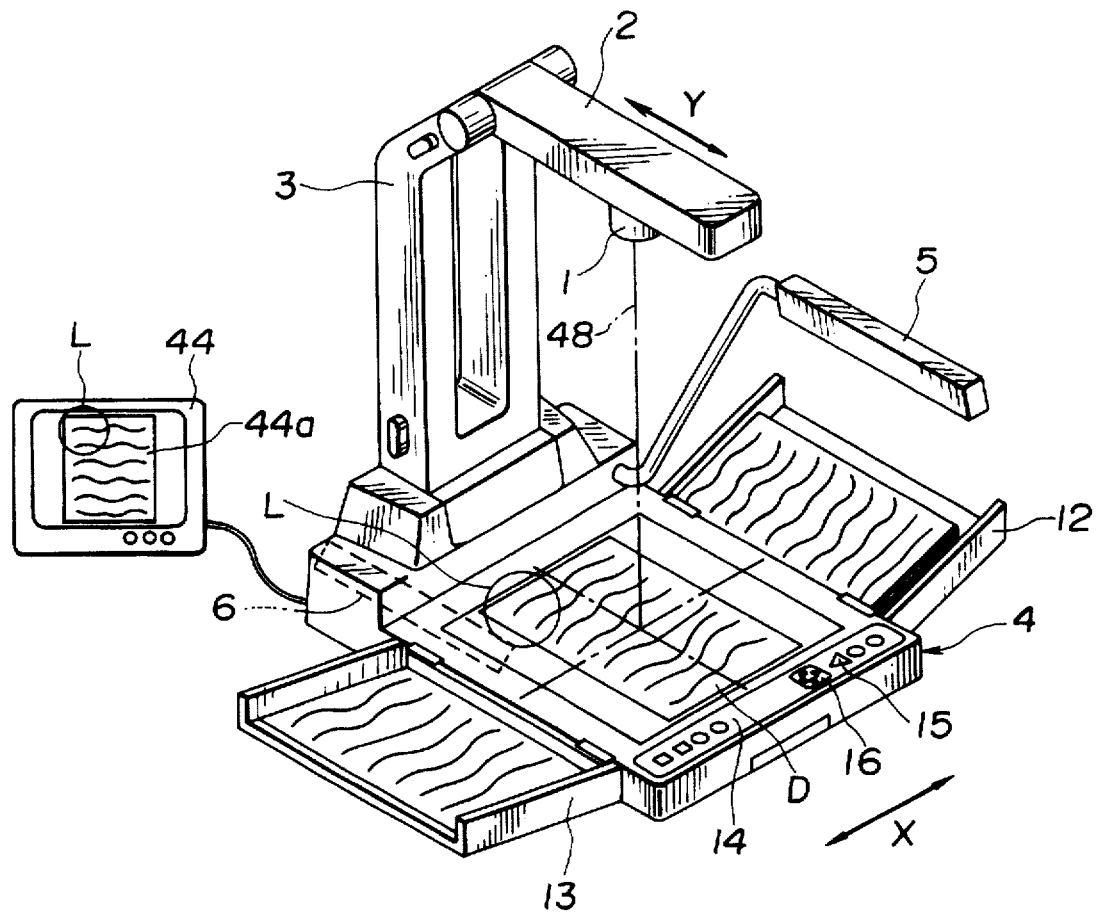
FIG. 11(a) is a perspective view illustrating an image input operation of a plurality of originals.

The amount of conveyance of the original D depends on the kind of the original D. Hence, the number of revolution of the pulse motor for driving the pair of feed rollers 23 is changed by control means in accordance with the kind of the original D (the length of the original D in the conveying direction) determined by the means for determining the kind of the original. The pulse motor for driving the pair of feed rollers 23 stops its revolution when the center of the original D reaches substantially the x optical axis 48 (a central portion of the original mount 4) of the camera lens 1. A series of sheet-feeding operations is thereby completed. FIG. 11(a) illustrates the state at that time. In an initial state, the optical axis 48 of the camera lens 1 is positioned at a substantially central portion of the original mount 4, and the camera lens 1 is set to the wide end. Hence, substantially the entire image of the original D is displayed on the video monitor 44. However, since the lengths of the A3 size and the B4 size are longer than the glass length b shown in FIG. 5, two ends of an A3-size original or a B4-size original are hidden when it is set on a central portion of the original mount 4.

If originals $D_0$ are not set on the sheet-feeding tray 12 and the sensor 27 for detecting the presence of an original does not detect an original when the original-feeding button 15 has been operated, the absence of an original is displayed by means (not shown). If the fed-sheet detector 28 does not detect an original after the lapse of a predetermined time period even when the original-feeding button 15 has been operated and originals $D_0$ are set in the sheet-feeding tray 12, a sheet jam is displayed by means (not shown). If a sheet jam occurs during a sheet-feeding operation, a jammed sheet can be easily removed by removing the glass 11 (not shown in FIG. 11(a)) from the original mount 4.

Next, a description will be provided of an operation of changing the imaging range, with reference to FIGS. 11(a) through 14.

In the operation of changing the imaging range of the present embodiment, the fed original D is reciprocated in the directions of the x axis shown in FIG. 11(a) by a predetermined amount, and the camera lens 1 is reciprocated in the directions of the y axis by a predetermined amount. This operation is performed through the imaging-position-changing button 16 provided at a portion of the operation panel 14. The above-described movement of the original D is performed by driving the feed belt 22, and the camera lens 1 is driven by the following means.

A description will now be provided of driving means for the camera lens 1 with reference to FIGS. 12(a) and 12(b). FIG. 12(a) is a horizontal cross-sectional view of the arm 2, and FIG. 12(b) is a vertical cross-sectional view of the arm 2.

A pulse motor 36 for driving the camera lens 1 is disposed at the side of the base end (the side of the post 3) of the arm 2. A pulley 37 is mounted on the rotation shaft of the pulse motor 36. A ball screw is formed in a direct-acting shaft. A guide shaft 39 is provided in parallel with the direct-acting shaft 38. These components constitute camera moving means. A pulley 40 is fixed to one end of the direct-acting shaft 38. The direct-acting shaft 38 is rotatably supported by bearings. A pulley belt 41 is stretched between the pulley 37 of the pulse motor 36 and the pulley 40 of the direct-acting shaft 38, so that the driving force of the pulse motor 36 is transmitted to the direct-acting shaft 38. The camera lens 1 is fixed to a driving carriage 42. A portion of the driving carriage 42 meshes with the direct-acting shaft 38. Another portion of the driving carriage 42 is slidably supported on the guide shaft 39. A window 2a is formed in the lower surface of the arm 2, and a distal-end portion (lower-end portion) of the camera lens 1 protrudes from the window 2a. By the rotation of the direct-acting shaft 38, the driving carriage 42 including the camera lens 1 can reciprocate in the axial direction (the longitudinal direction of the arm 2). The driving means for the camera lens 1 is not limited to the above-described configuration. For example, the driving means may comprise a timing belt.

Figure 11B:
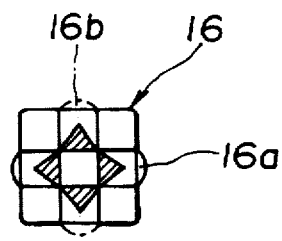
FIG. 11(b) is a schematic diagram of an imaging-position-changing button.

As shown in FIG. 11(b), the imaging-position-changing button 16 comprises an x-direction-changing button 16a and a y-direction-changing button 16b, which are provided as one body.

In a state in which the original D is fed to a central portion of the original mount 4, the conveying roller 18a and the sheet-discharging roller 19a are separated from the retard roller 18b and the sheet-discharging driven roller 19b with predetermined gaps, respectively. The uppermost sheet of the originals $D_0$ set on the sheet-feeding tray 12 is separated from the sheet-feeding roller 17 with a predetermined gap. Accordingly, the conveying path for the original D is in an opened state.

In the block diagram shown in FIG. 13, when the imaging-position-changing button 16 has been operated, a signal from the imaging-position-changing button 16 is transmitted to a system controller 51. Information relating to the kind of the original D to be fed has previously been transmitted from means 56 for determining the kind of the original to the system controller 51. When the imaging-position-changing signal has been transmitted to the system controller 51, a feed-roller-driving pulse motor 49 and a camera-lens-driving pulse motor 36 are rotatably driven in assigned x and y directions, respectively.

Driving signals for the feed-roller-driving pulse motor 49 and the camera-lens-driving pulse motor 36 are transmitted via corresponding motor driving circuits 50. A control signal indicating the amount and the direction of revolution transmitted to the feed-roller-driving pulse motor 49 is always transmitted to an x-direction storage unit 57, which stores the direction and the amount of revolution. The system controller 51 calculates and confirms the moving position of the original D based on the stored data. The maximum amount of revolution in one direction of the feed-roller-driving pulse motor 49 is determined based on information obtained from the means 56 for determining the kind of the original (more specifically, substantially half the length of the original D in the conveying direction). When the amount of revolution of the feed-roller-driving pulse motor 49 has reached the maximum value, the revolution of the feed-roller-driving pulse motor 49 is stopped, so that the feed-roller-driving pulse motor 49 cannot rotate further in the one direction.

A driving signal indicating the amount and the direction of the revolution of the camera-lens-driving pulse motor 36 is always transmitted to a y-direction storage unit 58, which stores the direction and the amount of revolution. The system controller 51 calculates and confirms the moving position of the camera lens 1 based on the stored data. The maximum amount of revolution in one direction of the camera-lens-driving pulse motor 36 has previously been set (more specifically, substantially half the length of the longer side of an A4-size original). When the amount of revolution of the camera-lens-driving pulse motor 36 has reached the maximum value, the revolution of the camera-lens-driving pulse motor 36 is stopped, so that the camera-lens-driving pulse motor 36 cannot rotate further in the same direction. From the viewpoint of control, when the imaging-position-changing button 16 is operated, the results of detection of the fed-sheet sensor 28 and the discharged-sheet sensor 29 are neglected. Although the maximum amounts of revolution of the feed-roller-driving pulse motor 49 and the camera-lens-driving pulse motor 36 are provided by controlling the amounts of revolution of the respective motors, the method for providing the maximum amounts is not limited to such a method. For example, the maximum positions of the feed roller and the camera lens may be detected by providing position detection sensors or the like.

Next, a description will be provided of operation procedures when it is intended to enlarge and display a portion L of the original D shown in FIG. 11(a) on the video monitor.

Figure 14:
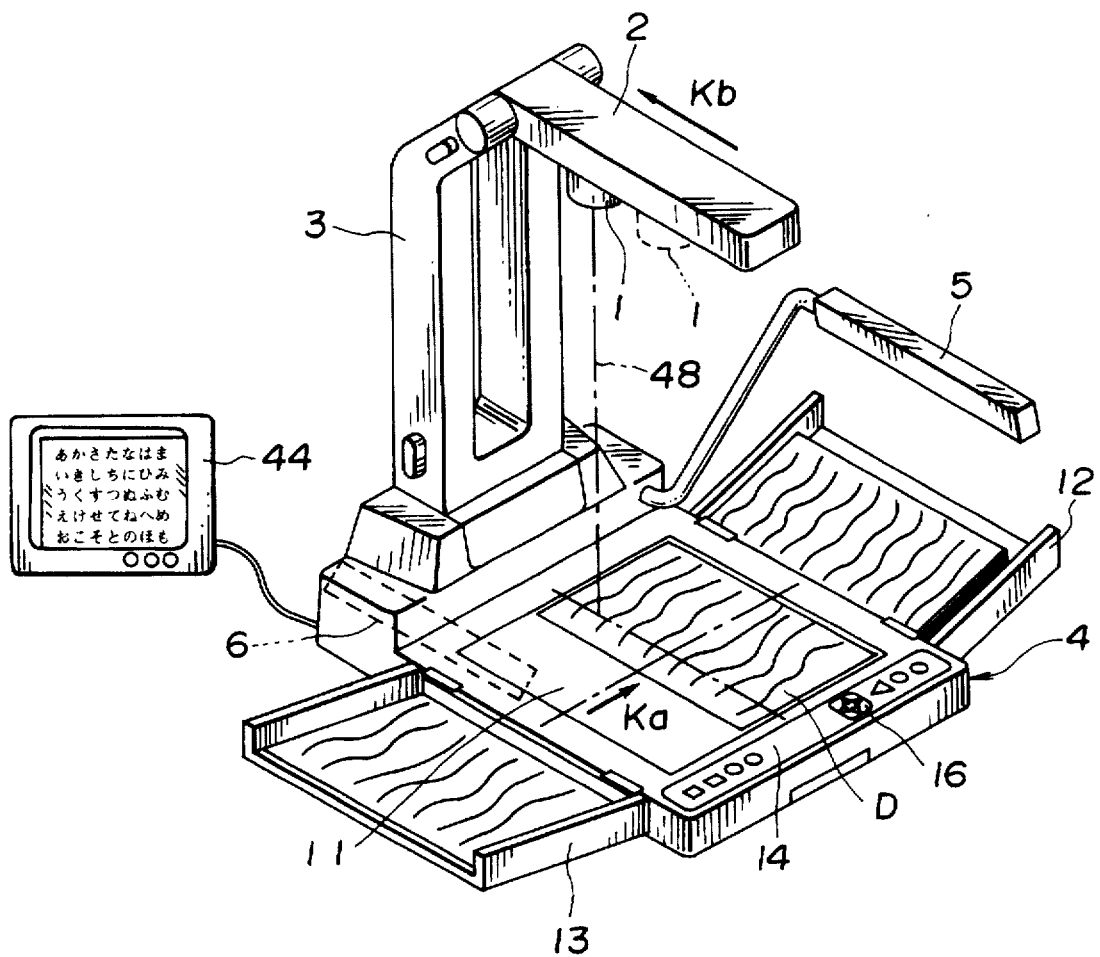
FIG. 14 is a perspective view illustrating the imaging-position-changing operation.

First, a right arrow button of the x-direction-changing button 16a shown in FIG. 1(b) is depressed, whereby the original D moves in the direction of arrow Ka shown in FIG. 14. The operator stops the button operation at an appropriate position, while watching images displayed on the video monitor 44, to stop the original D. Thereafter, an upper arrow button of the y-direction-changing button 16b shown in FIG. 11(b) is depressed, whereby the camera lens 1 moves to the direction of arrow Kb shown in FIG. 14. The operator stops the button operation at an appropriate position, while watching images displayed on the video monitor 44, to stop the camera lens 1. Either the x-direction operation or the y-direction operation may be started first.

If the position of the original D displayed on the video monitor 44 is inappropriate, fine adjustment is further performed by operating the imaging-position-changing button 16. The camera lens 1 is operated to the telephoto side using the zooming button provided on a portion of the operation panel 14, and the size of the image on the video monitor 44 is selected. The above-described zooming operation may be performed before changing the imaging range.

An initializing button 59 (see FIG. 13) is provided on a portion of the operation panel 14. By operating the initializing button 59, the imaging range returns to the range shown in FIG. 11(a) (the imaging range immediately after feeding the original D). In FIG. 13, when a signal from the initializing button 59 has been transmitted to the system controller 51, the driving pulse motors 36 and 49 are controlled so as to move the original D and the camera lens 1 to the initial positions stored in the x-direction storage unit 57 and the y-direction storage unit 58, respectively. At that time, the camera lens 1 is controlled to move to the wide end. The imaging range thereby returns to the state shown in FIG. 11(a), so that substantially the entire region of the original D is displayed.

Figure 15:
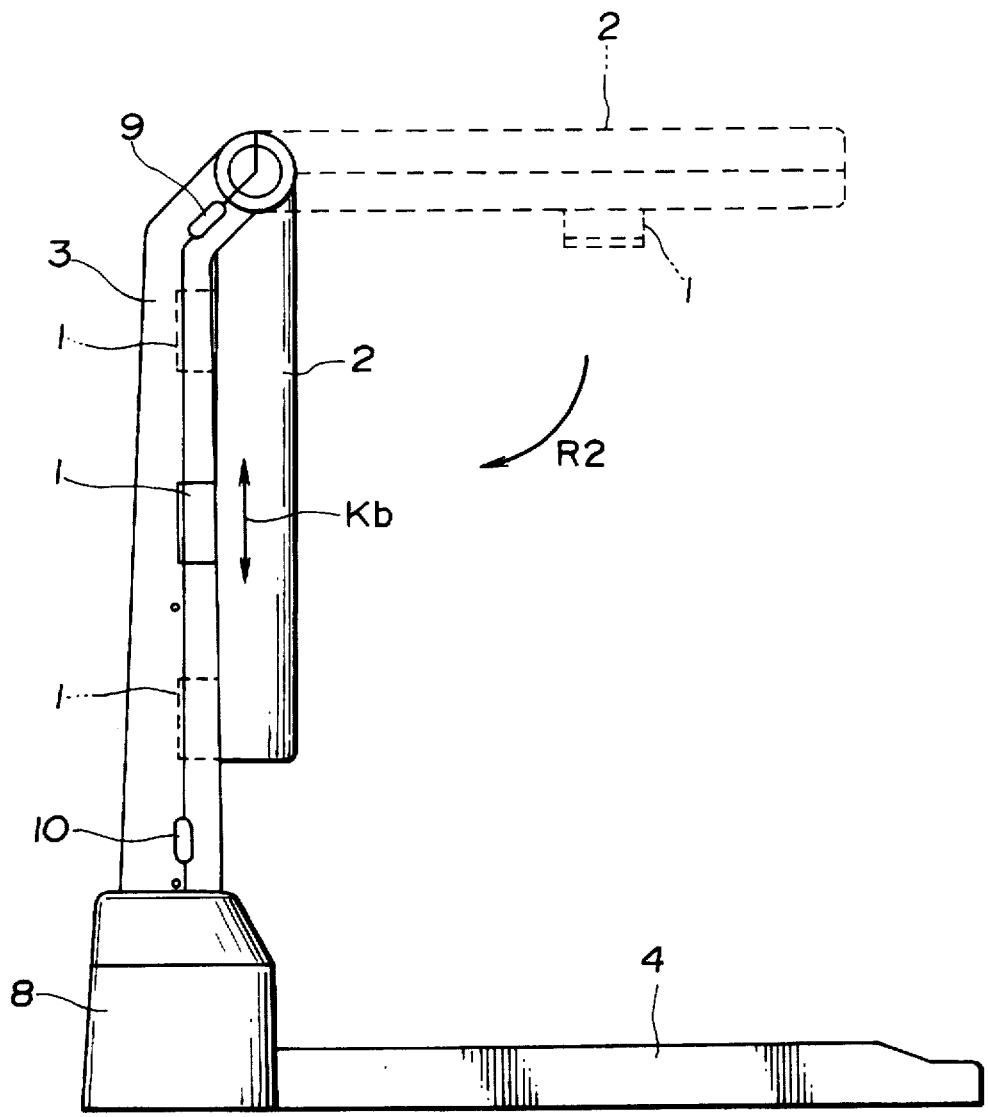
FIG. 15 is a diagram illustrating an operation when imaging a large object.

The present apparatus can also display a large object which cannot be mounted on the original mount 4. As shown in FIG. 15, the arm 2 at the imaging position (indicated by broken lines) is rotated in the direction of arrow R2 by depressing the arm release button 9, to be set in an accommodated position (indicated by solid lines). At that time, the camera lens 1 is accommodated in an opening 60 (see FIG. 1) formed in the post 3. Thus, it is possible to photograph an object which is not mounted on the original mount 4, for example, an object placed to the left of FIG. 15. Furthermore, by operating the y-direction-changing button 16b of the imaging-position-changing button 16 (not shown in FIG. 15), the camera lens 1 can be moved in the direction of arrow Kb. It is thereby possible to change the imaging range (only in one direction) within a predetermined range also when photographing an object which is not mounted on the original mount 4.

Next, a description will be provided of procedures of an operation of folding the arm 2 and the post 3 when accommodating them in the apparatus.

In FIG. 1, in a state in which the sheet-feeding tray 12 and the sheet-discharging tray 13 are opened, the sheet-feeding tray 12 and the sheet-discharging tray 13 are rotated by substantially 180 degrees in the directions of arrows R12 and R13, respectively, to be folded on the upper surface of the original mount 4. Either the sheet-feeding tray 12 or the sheet-discharging tray 13 may be rotated first.

Thereafter, the illuminating devices 5 and 6 are rotated in the directions of arrows R5 and R6, respectively, in this sequence, to be placed on the second object-mounting surface S2 (see FIG. 2) formed by the sheet-feeding tray 12 and sheet-discharging tray 13. Then, the arm 2 is rotated in the direction of arrow R2 by depressing the arm release button 9, to be set in the accommodated position. Finally, by depressing the post release button 10, the post 3 is placed on the second object-mounting surface S2 formed by the sheet-feeding tray 12 and the sheet-discharging tray 13. In order to prevent abrupt rotation during the folding operation, dampers, serving as cushioning materials, are provided for the arm 2, the post 3, the sheet-feeding tray 12 and the sheet-discharging tray 13. As shown in FIG. 2, in the accommodated state, the apparatus can be easily carried anywhere. While carrying the apparatus, a carrying handle 61 is drawn. In an assembling operation for the use of the apparatus, operation procedures opposite to the above-described procedures for accommodating the components are performed.

Second Embodiment

In the original-feeding means of the above-described first embodiment, a series of conveying operations is completed by discharging explained originals (for which image input operations have been completed) onto the sheet-discharging tray 13. In a second embodiment of the present invention, however, by providing a mechanism which functions as both sheet-feeding means and sheet-discharging means, an original discharged onto the sheet-discharge tray 13 can be fed again to the original mount 4.

Furthermore, by providing fed-sheet-number counting means and original-assigning means, an assigned x-th original can be instantaneously fed to a central portion of the original mount 4.

The configuration of the main body of the apparatus of the second embodiment is basically similar to that of the first embodiment. However, by adding the above-described means, further improvement in the performance of the apparatus can be realized. In the following description, the same components as those in the first embodiments are indicated by the same reference numerals, and a description thereof will be omitted.

Figure 16:
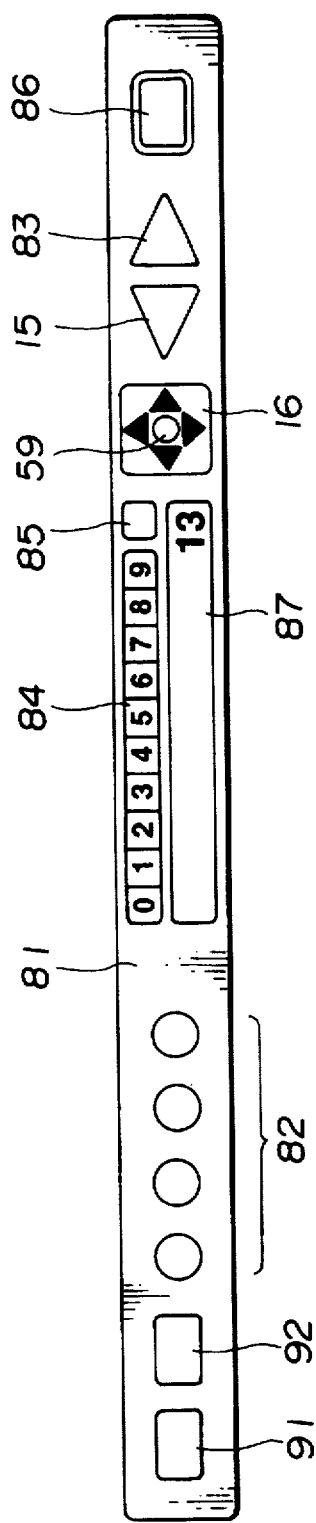
FIG. 16 is a top plan view illustrating the schematic configuration of an operation panel according to a second embodiment of the present invention.

FIG. 16 is a schematic diagram illustrating an operation panel 81 of the second embodiment. In FIG. 16, reference numeral 91 represents a power-supply switch for the main body of the apparatus, and reference numeral 92 represents a switch for the illuminating devices. Reference numeral 82 represents a group of camera-lens control buttons for controlling the camera lens 1, indicating zooming, focusing, white balance, and the like. Reference numeral 15 represents an original-feeding button for feeding a plurality of originals $D_O$ mounted on a sheet-feeding-side original tray 72 (to be described later) to a central portion of the original mount 4. Reference numeral 16 represents an imaging-position-changing button for changing the imaging range of the original. Reference numeral 59 represents an initializing button for returning the original-conveying mechanism to an initial state. These components are already included in the first embodiment.

Reference numeral 83 represents an original-reverse-feeding button for feeding an original D discharged onto a sheet-discharging-side original tray 73 (to be described later) again to the central portion of the original mount 4. Reference numeral 84 represents ten keys for assigning an original, and reference numeral 85 represents an original-assigning button. These original-assigning means are used for instantaneously feeding the assigned original D to the central portion of the original mount 4. Reference numeral 86 represents a forcedly-sheet-discharging button for forcedly discharging the original D onto the sheet-discharging-side original tray 73. Reference numeral 87 represents a liquid-crystal panel for notifying the operator of the state of the apparatus, the state of feeding, notice, warning and the like.

A description will now be provided of the configuration and the operation of two-directional original-feeding means and original-discharging means with reference to FIGS. 17 through 20.

Figure 17:
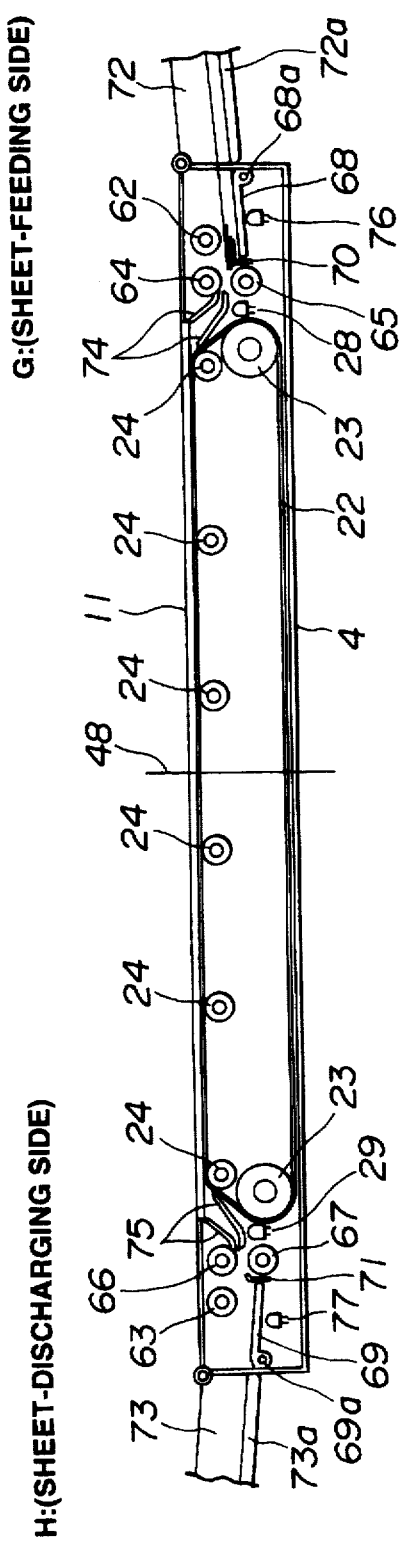
FIG. 17 is a vertical cross-sectional view illustrating the schematic configuration of original-feeding means of the second embodiment.

FIG. 17 is a vertical cross-sectional view illustrating the schematic configuration of the two-direction original-feeding means. As in the first embodiment, an original is fed from the right to the left in FIG. 17. In order to facilitate explanation, the right side is termed a sheet-feeding side G, and the left side is termed a sheet-discharging side H.

In FIG. 17, there are shown the sheet-feeding-side original tray 72 and the sheet-discharging-side original tray 73. As the sheet-feeding tray 12 and the sheet-discharging tray 13 described in the first embodiment, each of the sheet-feeding-side original tray 72 and the sheet-discharging-side original tray 73 is rotatably pivoted to a used position and an unused position with respect to the original mount 4, and is set inclined at a predetermined angle with respect to the original mount 4 when it is used. A sheet-feeding-side sheet-feeding roller 62 and a sheet-discharging-side sheet-feeding roller 63 are rotatably pivoted on the main body of the apparatus. A sheet-feeding-side conveying roller 64 and a sheet-feeding-side retard roller 65 are rotatably pivoted on the main body of the apparatus, and the sheet-feeding-side retard roller 65 is contactable/separable relative to the sheet-feeding-side conveying roller 64. A sheet-discharging-side conveying roller 66 and a sheet-discharging-side retard roller 67 are rotatably pivoted on the main body of the apparatus, and the sheet-discharging-side retard roller 67 is contactable/separable relative to the sheet-discharging-side conveying roller 66. As shown in FIG. 17, the sheet-feeding-side retard roller 65 and the sheet-discharging-side retard roller 67 are usually separated from the sheet-feeding-side conveying roller 64 and the sheet-discharging-side conveying roller 66 with predetermined gaps, respectively. The sheet-feeding roller 62, the conveying roller 64 and the retard roller 65 at the sheet-feeding side constitute a reverse sheet-discharging mechanism, as well as sheet-feeding means, and, as will be described later, discharge the original D mounted on the original mount 4 onto the sheet-feeding-side original tray 72. The sheet-feeding roller 63, the conveying roller 66 and the retard roller 67 at the sheet-discharging side constitute a reverse sheet-feeding mechanism as well as sheet-discharging means, and, as will be described later, feed the original D on the sheet-discharging tray 73 to the original mount 4.

A sheet-feeding-side pickup guide 68 and a sheet-discharging-side pickup guide 69 are rotatably pivoted around guide shafts 68a and 69a within predetermined ranges, respectively. Usually, the sheet-feeding-side pickup guide 68 and the sheet-discharging-side pickup guide 69 have substantially the same angles of inclination as those of the sheet-feeding-side original tray 72 and the sheet-discharging-side original tray 73 when they are set, respectively, and form substantially the same plane as the base 72a of the sheet-feeding-side original tray 72 and the base 73a of the sheet-discharging-side original tray 73. A sheet-feeding-side stopper 70 and a sheet-discharging-side stopper 71 are fixed to portions in the vicinity of the swinging ends of -the sheet-feeding-side pickup guide 68 and the sheet-discharging-side pickup guide 69, respectively. The leading ends of a plurality of originals mounted on the sheet-feeding-side original tray 72 or the sheet-discharging-side original tray 73 are aligned with respect to the feeding direction by contacting the sheet-feeding-side stopper 70 or the sheet-discharging-side stopper 71, respectively. Each of a sheet-feeding-side conveying guide 74 and a sheet-discharging-side conveying guide 75 forms an original-conveying path. There are also shown a sheet-feeding-side sensor 76 for detecting the presence of an original, and a sheet-discharging-side sensor 77 for detecting the presence of an original. Each of a fed-sheet sensor 28 and a discharged-sheet sensor 29 detects the presence and the conveying state of an original.

Next, a description will be provided of means for determining the kind of an original to be fed. However, since the basic configuration of this means is the same as in the first embodiment, a detailed description thereof will be omitted. While in the second embodiment the original D can be fed either from the sheet-feeding side or the sheet-discharging side, the original D is first set in the sheet-feeding-side original tray 72, as in the first embodiment. Accordingly, as in the first embodiment, the means for determining the kind of the original D performs the determination by detecting the positions of the width-regulating plates 30 and the length of the original D. However, since in the second embodiment the original D is also discharged onto the sheet-feeding-side original tray 72, some allowance is provided for the distance between the pair of width-regulating plates 30 for regulating the width of the original D. Accordingly, the original D is smoothly discharged onto the sheet-feeding-side original tray 72 without interfering with the width-regulating plates 30.

Figure 18:
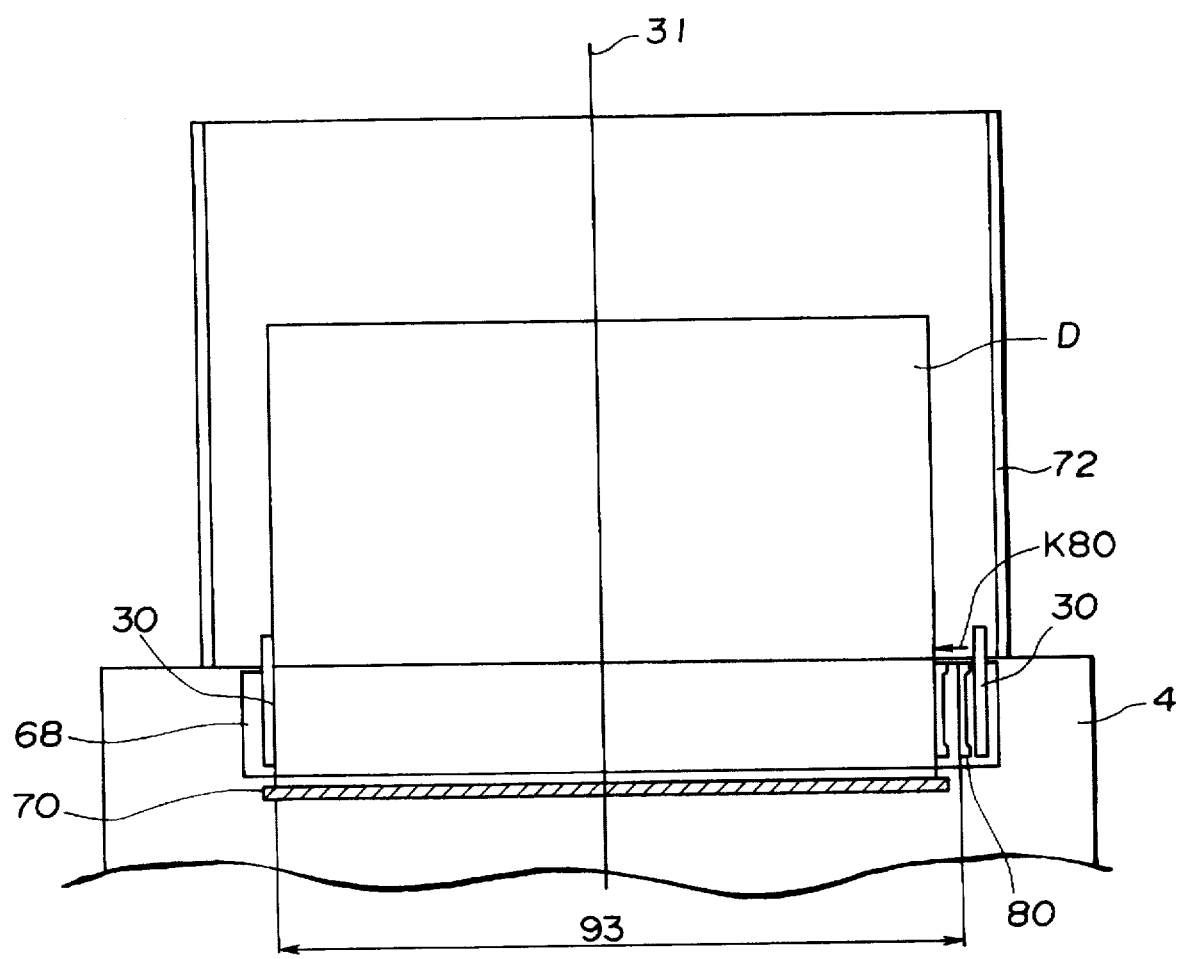
FIG. 18 is a top plan view illustrating the operation of original-width regulation means of the second embodiment.

In FIG. 18, a push plate 80 is provided at the side facing the original D of one of the pair of width-regulating plates 30 for regulating the width of the original D. The push plate 80 is provided so as to be movable by a predetermined amount in the direction of arrow K80 by plunger means. The push plate 80 operates at a predetermined time. Usually, the push plate 80 has a gap having a predetermined amount with the side of the original D. Hence, the distance 93 between the push plate 80 and another width-regulating plate 30 is more or less greater than the width of the original D. By operating the push plate 80, the set original D is pushed against the side of the other width-regulating plate 30. At that time, the center of the original D substantially coincides with the center 31 of the sheet-feeding-side original tray 72.

Figure 19:
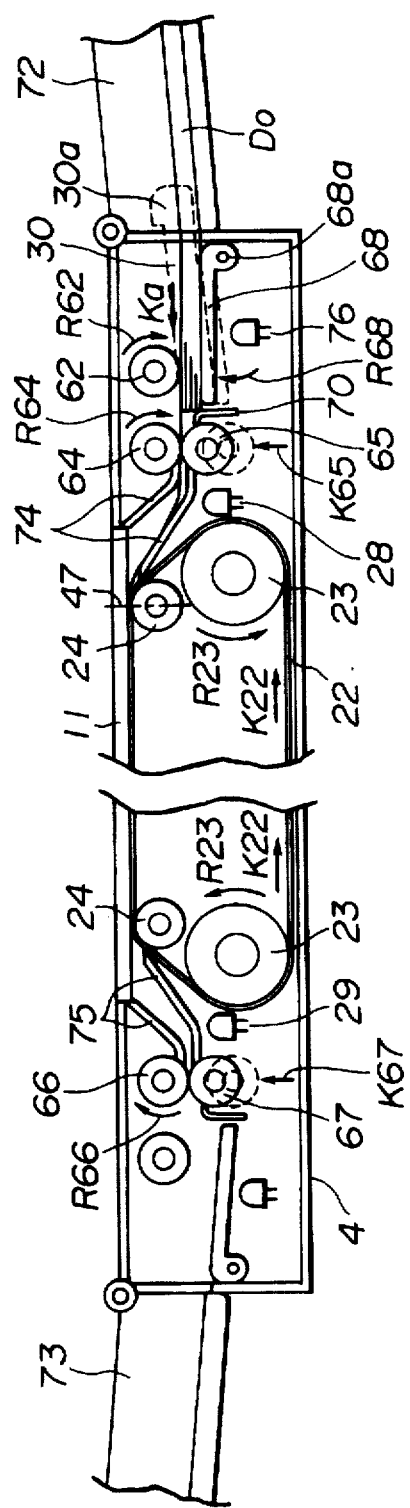
FIG. 19 is a partially-broken enlarged vertical cross-sectional view illustrating an ordinary original-feeding operation in the second embodiment.

A description will now be provided of an operation of feeding a plurality of originals, with reference to FIG. 19.

First, the positions of the width-regulating plates 30 provided on the sheet-feeding-side pickup guide 68 are adjusted in accordance with the kind of the set original D. Thereafter, a plurality of originals $D_O$ are set in the sheet-feeding-side original tray 72. The leading edges of the originals $D_O$ contact the sheet-feeding-side stopper 70 while the originals $D_O$ move along the sheet-feeding-side pickup guide 68. Thus, the plurality of originals $D_O$ are aligned with respect to the sheet-feeding direction. At that time, the sheet-feeding-side sensor 76 for detecting the presence of an original detects that the originals $D_O$ are present on the sheet-feeding-side original tray 72. The above-described means for determining the kind of the original detects the kind of the originals $D_O$. In an initial state, the uppermost sheet of the plurality of originals $D_O$ is separated from the sheet-feeding-side sheet-feeding roller 62 with a predetermined gap. The sheet-feeding-side retard roller 65 and the sheet-discharging-side retard roller 67 are separated from the sheet-feeding-side conveying roller 64 and the sheet-discharging-side conveying roller 66 with predetermined gaps, respectively.

Thereafter, the original-feeding button 15 provided on the operation panel 81 shown in FIG. 16 is operated. As a result, a sheet-discharging operation is first performed. When an original D has already been fed, the original D is discharged onto the sheet-discharging-side original tray 73.

As shown in FIG. 19, the sheet-discharging-side retard roller 67 is moved in the direction of arrow K67 by means (not shown), to be in pressure contact with the sheet-discharging-side conveying roller 66, and the sheet-discharging-side conveying roller 66 rotates in the direction of arrow R66. At that time, the sheet-discharging-side retard roller 67 is rotatably driven by the rotation of the sheet-discharging-side conveying roller 66. The pair of feed rollers 23 are rotated in the direction of arrow R23 by driving means, such as a pulse motor or the like, whereby the feed belt 22 is moved in the direction of arrow K22. If the original D is present, the original D is conveyed in the direction of arrow K22 together with the feed belt 22.

The original D is conveyed along the sheet-discharging-side conveying path 75, and is grasped between the sheet-discharging-side conveying roller 66 and the sheet-discharging-side retard roller 67. Since the rotating speed of the sheet-discharging-side conveying roller 66 is set to be higher than the rotating speed of the feed belt 22, the original D is conveyed while being pulled with a force of a certain degree, so that bending of the original D is prevented. When the trailing edge of the original D has been detected by the discharged-sheet sensor 29, the drive of the feed roller 23 is stopped, and after the lapse of a predetermined time period, the rotation of the sheet-discharging-side conveying roller 66 is also stopped. The sheet-discharging-side retard roller 67 again returns to a separated state. At that time, the trailing edge of the original D is completely separated from the sheet-discharging-side conveying roller 66 and the sheet-discharging-side retard roller 67, and is accommodated in the sheet-discharging-side original tray 73. If the discharged-sheet sensor 29 does not detect the original D even after the lapse of a predetermined time period after the pair of feed rollers 23 have been driven, it is determined that the original D is absent. The operation is stopped at that time, and the next operation is performed.

Next, a sheet-feeding operation is started. After the sheet-discharging operation has been completed, the push plate 80 shown in FIG. 18 is moved in the direction of arrow K80 by the plunger means, so that the plurality of originals $D_O$ contact one of the width-regulating plates 30. Thus, the plurality of originals $D_O$ are positioned in the direction of the width. As shown in FIG. 19, the sheet-feeding-side retard roller 65 is moved in the direction of arrow K65 by plunger means, to be in pressure contact with the sheet-feeding-side conveying roller 64. Thereafter, the sheet-feeding-side pickup guide 68 is rotated around the guide shaft 68a in the direction of arrow R68 by plunger means, whereby the uppermost sheet of the plurality of originals $D_O$ is in pressure contact with the sheet-feeding-side sheet-feeding roller 62 with a predetermined force.

Thereafter, the sheet-feeding-side sheet-feeding roller 62 starts to rotate in the direction of arrow R62. At the same time, the sheet-feeding-side conveying roller 64 starts to rotate in the direction of arrow R64, whereby the sheet-feeding-side retard roller 65 starts to rotate. The uppermost sheet of the plurality of originals $D_O$ is thereby conveyed in the direction of arrow Ka. A single original D is separated after passing through the sheet-feeding-side conveying roller 64 and the sheet,-feeding-side retard roller 65, and is conveyed in the direction of arrow Ka. Since this separation operation is known and is not related to the gist of the invention of the present application, a detailed description thereof will be omitted.

The separated original D is further conveyed in the direction of arrow Ka along the sheet-feeding-side conveying path 74. Thereafter, the leading edge of the conveyed original D is detected by the fed-sheet sensor 28. The sheet-feeding-side pickup guide 68 rotates around the guide shaft 68a in a direction opposite to the direction of arrow R68 shown in FIG. 19, and returns to the initial state. In this state, the original D is conveyed while being grasped by the sheet-feeding-side conveying roller 64 and the sheet-feeding-side retard roller 65. After the lapse of a predetermined time period after the fed-sheet sensor 28 has detected the leading edge of the original D, the drive of the sheet-feeding-side sheet-feeding roller 62 and the sheet-feeding-side conveying roller 64 is stopped, so that the conveyance of the original D is stopped. At that time, the leading edge of the original D reaches the sheet-feeding-side contact edge portion 47 between the feed belt 22 and glass 11. The original D stops while providing a certain amount of loop (deflection curve), and the leading edge of the original D is slightly driven against the contact end portion 47 between the feed belt 22 and the glass 11 with a predetermined force due to the stiffness of the original D. The registration of the original D with respect to the conveying direction is thereby performed, to prevent oblique conveyance.

Thereafter, the pair of feed rollers 23 are rotated in the direction of arrow R23 by the driving means, such as the pulse motor or the like, whereby the feed belt 22 is moved in the direction of arrow K22. At that time, the plurality of pinch rollers 24 are rotatably driven while causing the feed belt 22 to be in pressure contact with the conveying surface of the glass 11 with a predetermined force. The original D is conveyed in accordance with the movement of the feed belt 22 while being grasped between the glass 11 and the feed belt 22. This is caused by a difference in coefficients of friction. That is, the coefficient of friction between the original D and the feed belt 22 is set to be greater than the coefficient of friction between the original D and the glass 11. After the lapse of a predetermined time period after the pair of feed rollers 23 have started to rotate, the sheet-feeding-side retard roller 65 separates from the sheet-feeding-side conveying roller 64, and returns to the initial state. Thus, the conveyance of the original D is performed only by the feed belt 22.

The amount of conveyance of the original D differs depending on the kind of the original D (the length of the original D in the conveying direction). The number of revolutions of the pulse motor for driving the pair of feed rollers 23 is changed in accordance with the kind of the original D determined by the means for determining the kind of the original. The pair of feed rollers 23 stop rotating when the center of the original D reaches substantially the x optical axis 48 of the camera lens 1 (see FIG. 17). A series of sheet-feeding operations are thereby completed.

If originals $D_0$ are not set on the sheet-feeding-side original tray 72 and the sensor 76 for detecting the presence of an original does not detect an original when the original-feeding button 15 has been operated, the absence of an original is displayed on the liquid-crystal panel 87 of the operation panel 81 (see FIG. 16). If the fed-sheet sensor 28 does not detect an original after the lapse of a predetermined time period even when the original-feeding button 15 has been operated and the originals $D_0$ are set in the sheet-feeding-side original tray 72, a sheet jam is displayed on the liquid-crystal panel 87 of the operation panel 81.

Figure 20:
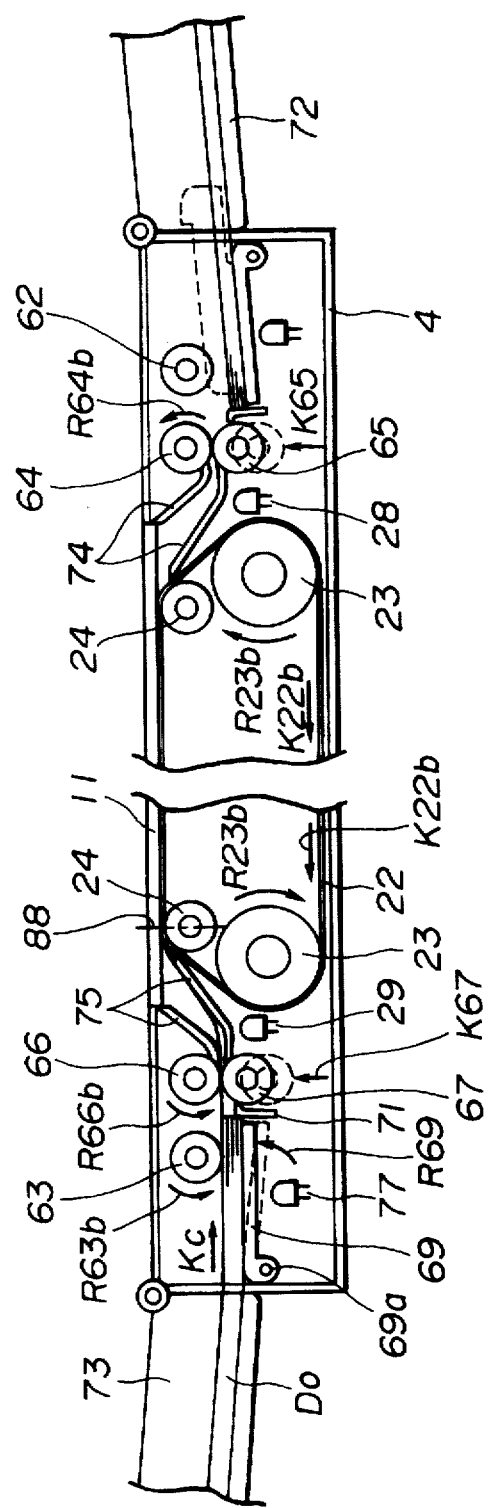
FIG. 20 is a partially-broken enlarged vertical cross-sectional view illustrating a reverse original-feeding operation in the second embodiment.

A description will now be provided of a reverse sheet-feeding operation for the original D with reference to FIG. 20. The basic operation is the same as an ordinary original-feeding operation. For example, if the original D discharged onto the sheet-discharging-side original tray 73 is utilized again whenever necessary, the operability of the apparatus is further improved. When the original-reverse-feeding button 83 provided on the operation panel 81 (see FIG. 16) has been operated, a reverse sheet-discharging operation is first performed. If the original D is present on the original mount 4, the original D is discharged onto the sheet-feeding-side original tray 72. As shown in FIG. 20, the sheet-feeding-side retard roller 65 is moved in the direction of arrow K65 by the plunger means, to be in pressure contact with the sheet-feeding-side conveying roller 64, and the sheet-feeding-side conveying roller 64 rotates in the direction of arrow R64b. At that time, the sheet-feeding-side retard roller 65 is rotatably driven by the rotation of the sheet-feeding-side conveying roller 64. The pair of feed rollers 23 are rotated in the direction of arrow R23b by the driving means, such as the pulse motor or the like. The feed belt 22 is thereby moved in the direction of arrow K22b. If an original D is present, the original D is conveyed together with the feed belt 22 in the direction of arrow K22b. The original D is conveyed along the sheet-feeding-side conveying path 74, and is grasped between the sheet-feeding-side conveying roller 64 and the sheet-feeding-side retard roller 65. Since the rotating speed of the sheet-feeding-side conveying roller 64 is set to be higher than the rotating speed of the feed belt 22, the original D is conveyed while being pulled with a force of a certain degree, so that bending of the original D is prevented. When the trailing edge of the original D in the conveying direction has been detected by the fed-sheet sensor 28, the drive of the feed roller 23 is stopped, and after the lapse of a predetermined time period, the rotation of the sheet-feeding-side conveying roller 64 is also stopped. The sheet-feeding-side retard roller 65 again returns to the separated state. At that time, the trailing edge of the original D in the conveying direction is completely separated from the sheet-feeding-side conveying roller 64 and the sheet-feeding-side retard roller 65, and is accommodated in the sheet-feeding-side original tray 72. By the movement of the push plate 80 shown in FIG. 18 in the direction of arrow K80 by the plunger means, the original D discharged onto the sheet-feeding-side original tray 72 is aligned in the direction of the width. If the fed-sheet sensor 28 does not detect the original D even after the lapse of a predetermined time period after the pair of feed rollers 23 have been driven, it is determined that the original D is absent. The operation is stopped at that time, and the next operation is performed.

Next, a reverse sheet-feeding operation is started. In FIG. 20, after the reverse sheet-discharging operation has been completed, the sheet-discharging-side retard roller 67 is moved in the direction of arrow K67 by the plunger means, to be in pressure contact with the sheet-feeding-side conveying roller 66. Thereafter, the sheet-discharging-side pickup guide 69 is rotated around the guide shaft 69a in the direction of arrow R69 by plunger means, whereby the upper-most sheet of the plurality of originals $D_0$ discharged onto the sheet-discharging-side original tray 73 is in pressure contact with the sheet-discharging-side sheet-feeding roller 63 with a predetermined force.

Thereafter, the sheet-discharging-side sheet-feeding roller 63 starts to rotate in the direction of arrow R63b. At the same time, the sheet-discharging-side conveying roller 66 starts to rotate in the direction of arrow R66b, whereby the sheet-discharging-side retard roller 67 starts to rotate. The upper-most sheet of the plurality of originals $D_0$ is thereby conveyed in the direction of arrow Kc. A single original D is separated after passing through the sheet-discharging-side conveying roller 66 and the sheet-discharging-side retard roller 67, and is conveyed in the direction of arrow Kc. The separated original D is further conveyed in the direction of arrow Kc along the sheet-discharging-side conveying path 75. Thereafter, the leading edge of the conveyed original D is detected by the discharged-sheet sensor 29. The sheet-discharging-side pickup guide 69 rotates around the guide shaft 69a in a direction opposite to the direction of arrow R69 shown in FIG. 20, and returns to the initial state. In this state, the original D is conveyed while being grasped by the sheet-discharging-side conveying roller 66 and the sheet-discharging-side retard roller 67. After the lapse of a predetermined time period after the discharged-sheet sensor 29 has detected the leading edge of the original D, the drive of the sheet-discharging-side sheet-feeding roller 63 and the sheet-discharging-side conveying roller 66 is stopped, so that the conveyance of the original D is stopped. At that time, the leading edge of the original D reaches the sheet-discharging-side contact end portion 88 between the feed belt 22 and glass 11. The original D stops while providing a certain amount of loop (deflection curve), and the leading edge of the original D is slightly driven against the contact end portion 88 between the feed belt 22 and the glass 11 with a predetermined force due to the stiffness of the original D. The registration of the original D with respect to the conveying direction is thereby performed, to prevent oblique conveyance.

Thereafter, the pair of feed rollers 23 are rotated in the direction of arrow R23b by the driving means, such as the pulse motor or the like, whereby the feed belt 22 is moved in the direction of arrow K22b. At that time, the plurality of pinch rollers 24 are rotatably driven while causing the feed belt 22 to be in pressure contact with the conveying surface of the glass 11 with a predetermined force. The original D is conveyed in accordance with the movement of the feed belt 22 while being grasped between the glass 11 and the feed belt 22. This is caused by a difference in coefficients of friction. That is, the coefficient of friction between the original D and the feed belt 22 is set to be greater than the coefficient of friction between the original D and the glass 11. After the lapse of a predetermined time period after the pair of feed rollers 23 have started to rotate, the sheet-discharging-side retard roller 67 separates from the sheet-discharging-side conveying roller 66, and returns to the initial state. Thus, the conveyance of the original D is performed only by the feed belt 22.

The amount of conveyance of the original D differs depending on the kind of the original D. The number of revolutions of the pulse motor for driving the pair of feed rollers 23 is changed in accordance with the kind of the original D determined by the means for determining the kind of the original. The pair of feed rollers 23 stop to rotate when the center of the original D reaches substantially the x optical axis 48 of the camera lens 1 (as seen in FIG. 17, a central portion of the original mount 4). A series of reverse sheet-feeding operations are thereby completed. If an original D is not discharged on the sheet-discharging-side original tray 73 and the sensor 77 for detecting the presence of an original does not detect an original when the original-reverse-feeding button 83 has been operated, the absence of an original is displayed on the liquid-crystal panel 87 of the operation panel 81 (see FIG. 16). If the discharged-sheet sensor 29 does not detect an original after the lapse of a predetermined time period even when the original-reverse-feeding button 83 has been operated, and the original D is set in the sheet-discharging-side original tray 73, a sheet jam is displayed on the liquid-crystal panel 87 of the operation panel 81 (see FIG. 16).

In the above-described second embodiment, by providing means for counting the number of fed sheets and original-assigning means, an assigned x-th original can be instantaneously fed to a central portion of the original mount. A description will now be provided of the means for counting the number of fed sheets.

The fed original D is counted by detecting the leading end of the original D in the feeding direction by the fed-sheet sensor 28. For example, a plus count is performed by a detection of the fed-sheet sensor 28 when the original-feeding button is operated in an ordinary state (a sheet-feeding operation from the sheet-feeding side to the sheet-discharging side), and a minus count is performed by a detection of the fed-sheet sensor 28 when the reverse-original-feeding button is operated.

Figure 21:
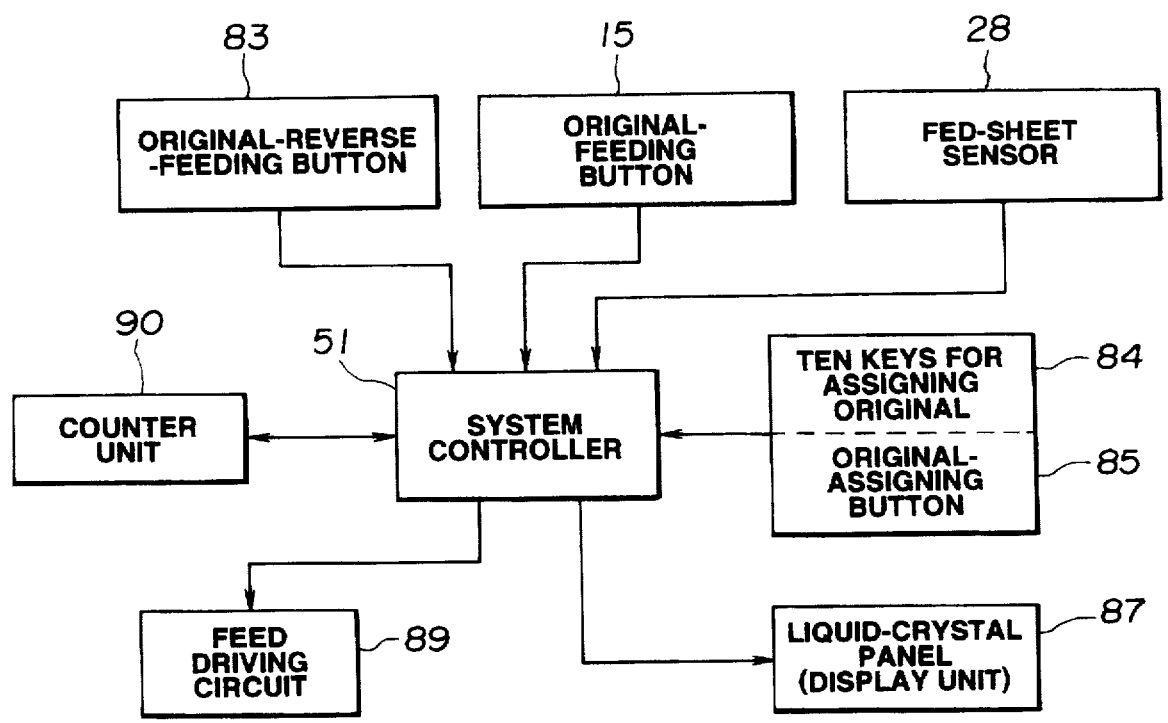
FIG. 21 is a block diagram illustrating feed counting means of the second embodiment.
Figure 22:
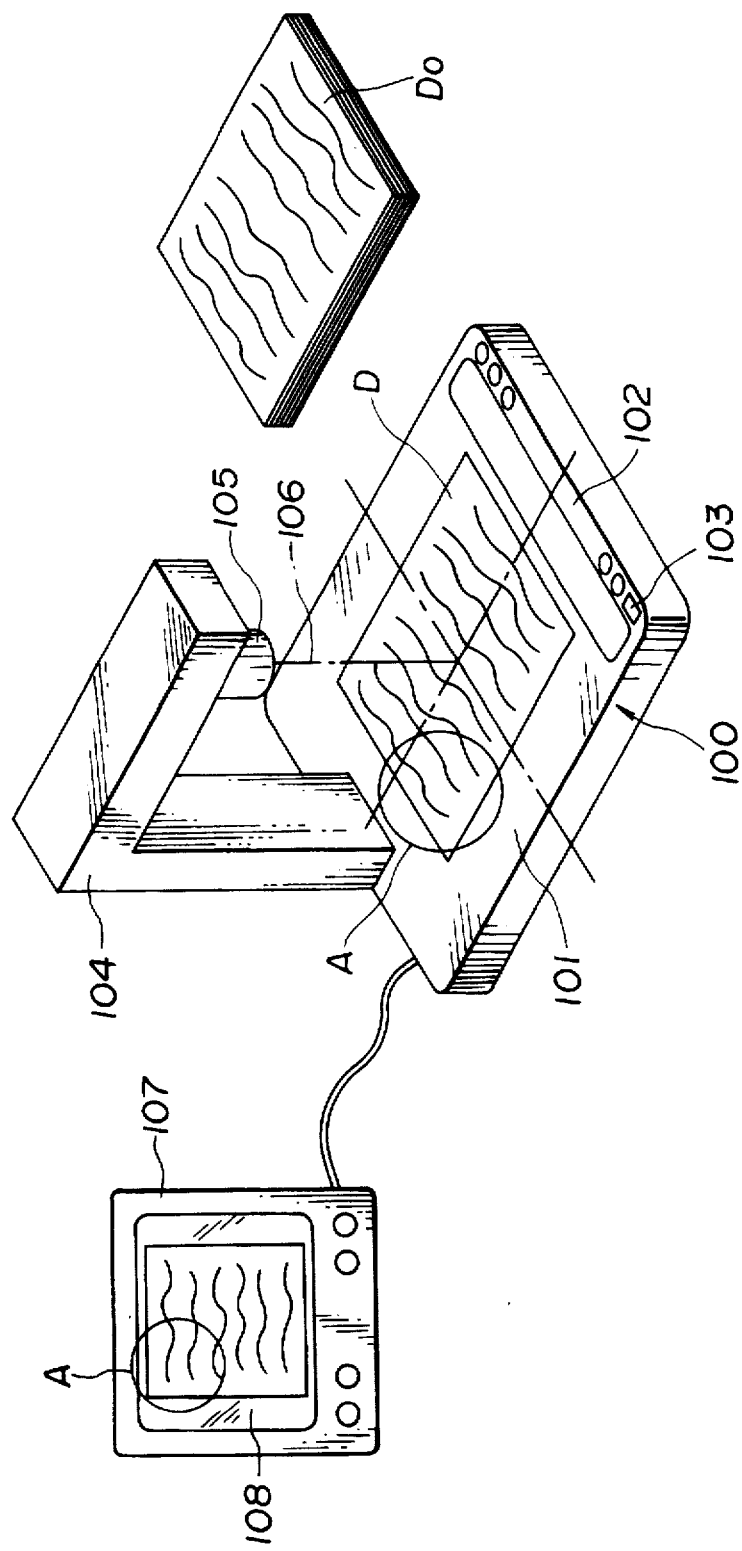
FIG. 22 is a perspective view illustrating an outline of a conventional image input apparatus.
Figure 23:
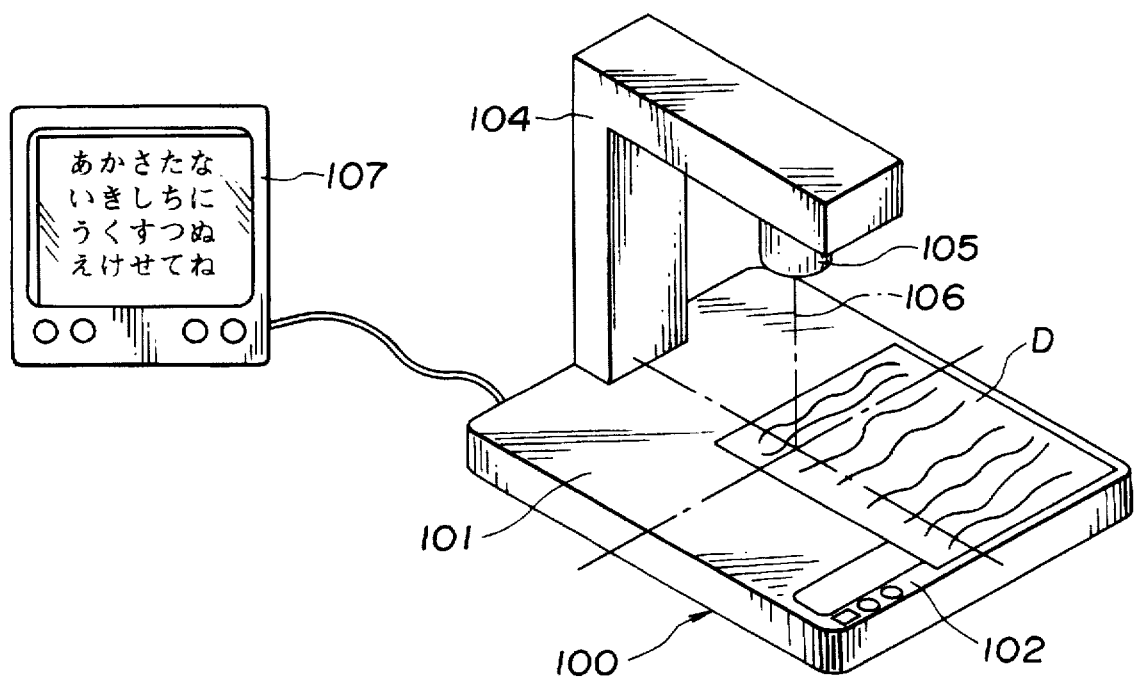
FIG. 23 is a perspective view illustrating an imaging-position-changing operation of the conventional image input apparatus shown in FIG. 22.

In the block diagram shown in FIG. 21, when the original-feeding button 15 or the original-reverse-feeding button 83 has been operated, a signal from the operated button is transmitted to the system controller 51 provided within the apparatus. The system controller 51 transmits a signal indicating feeding or reverse feeding of the original D to a driving unit (feed driving circuit) 89, whereby a feeding operation is started.

When the original-feeding button 15 has been operated, if a detection signal from the fed-sheet sensor 28 is transmitted to the system controller 51, that information is transmitted to a counter unit (means for counting the number of sheets) 90, and a plus count is performed. When the original-reverse-feeding button 83 has been operated, if a detection signal from the fed-sheet sensor 28 is transmitted to the system controller 51, that information is transmitted to the counter unit 90, and a minus count is performed.

The count number of fed sheets is displayed on the liquid-crystal panel 87. For example, if the count number equals 13, a number "13" is displayed on the liquid-crystal panel 87, as shown in FIG. 16. The count number is automatically reset when the power supply of the main body of the apparatus is disconnected. It is also possible to provide a forcing reset button. The original D may also be counted using the discharged-sheet sensor 29.

Next, a description will be provided of an original-assigning operation. The number of the x-th original D to be assigned (the original D to be fed to a central portion of the original mount 4 as the image to be input) is input using the ten keys 84 for assigning an original on the D operation panel 81 shown in FIG. 16. The input number is displayed on the liquid-crystal panel 87. By operating the original-assigning button 85, the assigned x-th original is instantaneously fed to the central portion of the original mount 4.

In the block diagram shown in FIG. 21, the number assigned by the ten keys 84 for assigning an original is transmitted to the system controller 51 by operating the original-assigning button 85. By comparing this number with the count number of the counter unit 90, it is determined whether an ordinary sheet-feeding operation (from the sheet-feeding side to the sheet-discharging side) is performed, a reverse sheet-feeding operation is performed, or the current state is maintained. If the assigned number is greater than the count number, an ordinary sheet-feeding operation is performed. If the assigned number is smaller than the count number, a reverse sheet-feeding operation is performed. If the assigned number equals the count number, the current state is maintained. The original feed driving unit 89 operates to feed the original D in response to a signal representing one of the above-described operations. At that time, the serial number of the fed sheet is counted by the means for counting the number of sheets, and is calculated by the system controller 51. When the count number has equaled the assigned number, the original-feeding operation is stopped. When the sheet-feeding-side sensor 76 for detecting the presence of an original or the sheet-discharging-side sensor 77 for detecting the presence of an original has detected that the original D has disappeared on the original tray at the sheet-feeding side, the sheet-feeding operation is stopped. While the imaging-position-changing button 16 is operated, the above-described means for counting the number of sheets (the detection of the fed-sheet sensor 28 and the discharged-sheet sensor 29) does not operate.

In the above-described second embodiment, by providing the forcedly-sheet-discharging button 86 (see FIG. 16), it is possible to perform only a sheet-discharging operation. When the forcedly-sheet-discharging button 86 has been operated, if an original D is fed on the original mount 4, the original D is discharged onto the sheet-discharging-side original tray 73. Since the sheet-discharging operation is the same as the sheet-discharging operation when the original-feeding button 15 is operated, a detailed description thereof will be omitted.

If the discharged-sheet sensor 29 does not detect an original even after the lapse of a predetermined time period, it is determined that the original D is absent, and the operation is stopped.

In the present apparatus, it is also possible to provide remote operation means (for example, a remote controller). The operability of the apparatus can be further improved by performing an operation from a remote location.

The present invention may also be applied to an over-head projector. In such a case, an image input to a lens may be projected onto a screen via an optical system, which constitutes output means.

The individual components shown in outline or designated by blocks in the drawings are all well known in the image input apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image input apparatus comprising:
   an original mount for setting an original having an image surface to be input;
   input means, disposed at a position facing said original mount, for inputting the image surface of the original on said original mount;
   original-moving means for moving the original across said original mount on a plane in parallel with a surface of said original mount;
   moving means for moving said input means in a direction substantially orthogonal to the direction of motion of the original by operation of said original-moving means across said original mount on the plane in parallel with a surface of said original mount;
   a sheet-feeding tray disposed at one side of said original mount in a moving direction of the original set on said original mount;
   a sheet-discharging tray disposed at another side of said original mount in a moving direction of the original set on said original mount;
   sheet-feeding means for sequentially feeding a plurality of originals mounted on said sheet-feeding tray to said original mount; and
   sheet-discharging means for sequentially discharging the originals on said original mount onto said sheet discharging tray;
   wherein said sheet-feeding tray and said sheet-discharging tray are disposed rotatable with respect to said original mount so as to assume released positions, provided at two sides of said original mount and locking positions, covering said original mount from above, and
   wherein an original-mounting surface facing said input means is formed at upper surfaces of said sheet-feeding tray and said sheet-discharging tray disposed at the locking positions.

2. An apparatus according to claim 1, wherein said input means comprises a camera lens, disposed above said original mount, for outputting and displaying input information onto a display unit, said display unit comprising a video monitor connected to said image input apparatus.

3. An apparatus according to claim 1, wherein said sheet-discharging means comprises a reverse sheet-feeding mechanism for supplying the originals on said sheet-discharging tray toward said original mount, and
   wherein said sheet-feeding means comprises a reverse sheet-discharging mechanism for discharging the originals on said original mount onto said sheet-feeding tray.

4. An apparatus according to claim 3, further comprising:
   sheet-number counting means for counting the number of fed originals; and
   original-assigning means for assigning a predetermined original from the plurality of originals,
   wherein the predetermined original is selected and set on said original mount.

5. An apparatus according to claim 1, further comprising output means for outputting the image surface input via said input means.

6. An apparatus according to claim 1, further comprising output means for outputting the image surface input via said input means in the form of an electrical signal.

7. An apparatus according to claim 1, further comprising output means for outputting the image surface via said input means in the form of an electrical signal.

8. An image input apparatus comprising:
   an original mount for setting an original having an image surface to be input;
   input means, disposed at a position facing said original mount, for inputting an image surface of the original on said original mount;
   original-moving means for moving the original across said original mount on a plane in parallel with a surface of said original mount; and
   moving means for moving said input means in a direction substantially orthogonal to a direction of motion of the original by operation of said original-moving means across said original mount on the plane in parallel with a surface of said original mount;
   a sheet-feeding tray disposed at one side of said original mount in a moving direction of the original set on said original mount;
   a sheet-discharging tray disposed at another side of said original mount in a moving direction of the original set on said original mount;
   sheet-feeding means for sequentially feeding a plurality of originals mounted on said sheet-feeding tray to said original mount; and
   sheet-discharging means for sequentially discharging the originals on said original mount onto said sheet discharging tray;
   wherein said sheet-feeding tray and said sheet-discharging tray are disposed rotatable with respect to said original mount so as to assume released positions, provided at two sides of said original mount and locking positions, covering said original mount from above, and
   wherein an original-mounting surface facing said input means is formed at upper surfaces of said sheet-feeding tray and said sheet-discharging tray disposed at the locking positions; and
   wherein said input means comprises a camera lens for inputting and displaying input information onto a display unit, said display unit comprising a video monitor connected to said image input apparatus.

9. An image reading and displaying apparatus comprising:
   an image input apparatus, comprising:
      an original mount for setting an original having an image surface to be input;
      input means, disposed at a position facing said original mount, for inputting the image surface of the original on said original mount;
      original-moving means for moving the original across said original mount;
      a sheet-feeding tray disposed at one side of said original mount in the moving direction of the original set on said original mount;
      a sheet-discharging tray disposed at another side of said original mount in the moving direction of the original set on said original mount for receiving the discharged sheet;
      sheet-feeding means for sequentially feeding a plurality of originals mounted on said sheet-feeding tray to said original mount; and
   output means for outputting and displaying the input information onto a display unit,
   wherein said sheet-feeding tray and said sheet-discharging tray are disposed rotatably with respect to said original mount so as to assume released positions, provided at two sides of said original mount, and locking positions, covering said original mount from above, and wherein an original-mounting surface facing said input means is formed at the upper surfaces of said sheet-feeding tray and said sheet-discharging tray disposed at the locking positions.

10. An image reading and displaying apparatus comprising:

an image input apparatus comprising:
an original mount for setting an original having an image surface to be input;
original-moving means for moving the original across said original mount;
input means, disposed at a position facing said original mount, for inputting the image surface of the original on said original mount;
a sheet-feeding tray disposed at one side of said original mount in the moving direction of the original set on said original mount;
a sheet-discharging tray disposed at another side of said original mount in the moving direction of the original set on said original mount for receiving the discharged sheet;
sheet-feeding means for sequentially feeding a plurality of originals mounted on said sheet-feeding tray to said original mount; and
output means for outputting and displaying the input information onto a display unit,
wherein said sheet-feeding tray and said sheet-discharging tray are disposed rotatably with respect to said original mount so as to assume released positions, provided at two sides of said original mount, and locking positions, covering said original mount from above, and
wherein an original-mounting surface facing said input means is formed at the upper surfaces of said sheet-feeding tray and said sheet-discharging tray disposed at the locking positions.

11. An image reading and displaying apparatus comprising:

an image input apparatus, comprising:
an original mount for setting an original having an image surface to be input;
a camera lens, disposed at a position facing said original mount, for inputting the image surface of the original on said original mount;
original-moving means for moving the original set on said original mount on a plane;
moving means for moving said camera lens in a direction substantially orthogonal to the direction of motion of the original on the plane, the motion resulting from operation of said original-moving means;
a sheet-feeding tray disposed at one side of said original mount in a moving direction of the original set on said original mount;
sheet-feeding means for sequentially feeding a plurality of originals mounted on said sheet-feeding tray to said original mount; and
a sheet-discharging tray disposed at another side of said original mount in a moving direction of the original set on said original mount;
sheet-discharging means for sequentially discharging the originals on said original mount onto said sheet discharging tray;
wherein said sheet-feeding tray and said sheet-discharging tray are disposed rotatable with respect to said original mount so as to assume released positions, provided at two sides of said original mount and locking positions, covering said original mount from above, and
wherein an original-mounting surface facing said input means is formed at upper surfaces of said sheet-feeding tray and said sheet-discharging tray disposed at the locking positions; and
a video monitor for displaying image information from said camera lens on a display unit.

12. An image input apparatus comprising:

an original mount for setting an original having an image surface to be input;
input means, disposed at a position facing said original mount, for inputting the image surface of the original on said original mount;
original-moving means for moving the original across said original mount on a plane in parallel with a surface of said original mount;
moving means for moving said input means in a direction crossing the direction of motion of the original by operation of said original-moving means across said original mount on the plane in parallel with a surface of said original mount;
a sheet-feeding tray disposed at one side of said original mount in the moving direction of the original set on said original mount;
sheet-feeding means for sequentially feeding a plurality of originals mounted on said sheet-feeding tray to said original mount; and
a sheet-discharging tray disposed at another side of said original mount in a moving direction of the original set on said original mount;
sheet-discharging means for sequentially discharging the originals on said original mount onto said sheet-discharging tray;
wherein said sheet-feeding tray and said sheet-discharging tray are disposed rotatable with respect to said original mount so as to assume released positions, provided at two sides of said original mount, and locking positions, covering said original mount from above, and
wherein an original-mounting surface facing said input means is formed at the upper surfaces of said sheet-feeding tray and said sheet-discharging tray disposed at the locking positions.

13. An image reading and displaying apparatus comprising:

an image input apparatus comprising:
an original mount for setting an original having an image surface to be input;
original-moving means for moving the original across said original mount on a plane in parallel with a surface of said original mount;
moving means for moving said input means in a direction substantially orthogonal to the direction of motion of the original by operation of said original-moving means across said original mount on the plane in parallel with a surface of said original mount;
input means, disposed at a position facing said original mount, for inputting the image surface of the original on said original mount;

a sheet-feeding tray disposed at one side of said original mount in the moving direction of the original set on said original mount;

a sheet-discharging tray disposed at another side of said original mount in the moving direction of the original set on said original mount;

sheet-feeding means for sequentially feeding a plurality of originals mounted on said sheet-feeding tray to said original mount; and sheet-discharging means for sequentially discharging the originals on said original mount onto said sheet-discharging tray; and output means for outputting and displaying the input information onto a display unit, wherein said sheet-feeding tray and said sheet-discharging tray are disposed rotatably with respect to said original mount so as to assume released positions, provided at two sides of said original mount, and locking positions, covering said original mount from above, and wherein an original-mounting surface facing said input means is formed at the upper surfaces of said sheet-feeding tray and said sheet-discharging tray disposed at the locking positions.

14. An image reading and displaying apparatus comprising:

an image input apparatus, comprising:

an original mount for setting an original having an image surface to be input;

input means, disposed at a position facing said original mount, for inputting the image surface of the original on original mount;

original-moving means for moving the original across said original mount on a plane in parallel with a surface of said original mount;

moving means for moving said input means in a direction crossing a direction of motion of the original by operation of said original-moving means across said original mount on the plane in parallel with a surface of said original mount;

a sheet-feeding tray disposed at one side of said original mount in the moving direction of the original set on said original mount;

a sheet-discharging tray disposed at another side of said original mount in the moving direction of the original set on said original mount;

sheet-feeding means for sequentially feeding a plurality of originals mounted on said sheet-feeding tray to said original mount; and sheet-discharging means for sequentially discharging the originals on said original mount onto said sheet-discharging tray; and output means for outputting and displaying the input information onto a display unit, wherein said sheet-feeding tray and said sheet-discharging tray are disposed rotatably with respect to said original mount so as to assume released positions, provided at two sides of said original mount, and locking positions, covering said original mount from above, and wherein an original-mounting surface facing said input means is formed at the upper surfaces of said sheet-feeding tray and said sheet-discharging tray disposed at the locking positions.

15. An image input apparatus comprising:

an original mount for setting an original having an image surface to be input;

input means, disposed at a position facing said original mount, for inputting the image surface of the original on said original mount;

original-moving means for moving the original across said original mount;

a sheet-feeding tray disposed at one side of said original mount in a moving direction of the original set on said original mount;

a sheet-discharging tray disposed at another side of said original mount in a moving direction of the original set on said original mount and for receiving the discharged sheet; and sheet-feeding means for sequentially feeding a plurality of originals mounted on said sheet-feeding tray to said original mount, wherein said sheet-feeding tray and said sheet-discharging tray are disposed rotatably with respect to said original mount so as to assume released positions, provided at two sides of said original mount and locking positions, covering said original mount from above, and wherein an original-mounting surface facing said input means is formed at upper surfaces of said sheet-feeding tray and said sheet-discharging tray disposed at the locking positions.

16. An image input apparatus comprising:

an original mount for setting an original having an image surface to be input;

input means, disposed at a position facing said original mount, for inputting an image surface of the original on said original mount;

original-moving means for moving the original across said original mount;

a sheet-feeding tray disposed at one side of said original mount in a moving direction of the original set on said original mount;

a sheet-discharging tray disposed at another side of said original mount in a moving direction of the original set on said original mount and for receiving the discharged sheet; and sheet-feeding means for sequentially feeding a plurality of originals mounted on said sheet-feeding tray to said original mount, wherein said sheet-feeding tray and said sheet-discharging tray are disposed rotatably with respect to said original mount so as to assume released positions, provided at two sides of said original mount and locking positions, covering said original mount from above, and wherein an original-mounting surface facing said input means is formed at upper surfaces of said sheet-feeding tray and said sheet-discharging tray disposed at the locking positions; and wherein said input means comprises a camera lens for inputting and displaying input information onto a display unit, said display unit comprising a video monitor connected to said image input apparatus.

17. An image input apparatus comprising:

an original mount for setting an original having an image surface to be input;

input means, disposed at a position facing said original mount, for inputting the image surface of the original on said original mount;

original-moving means for moving the original across said original;

a sheet-feeding tray disposed at one side of said original mount in the moving direction of the original set on said original mount;

sheet-feeding means for sequentially feeding a plurality of originals mounted on said sheet-feeding tray to said original mount; and a sheet-discharging tray disposed at another side of said original mount in a moving direction of the original set on said original mount and for receiving the discharged sheet, wherein said sheet-feeding tray and said sheet-discharging tray are disposed rotatably with respect to said original mount so as to assume released positions, provided at two sides of said original mount, and locking positions, covering said original mount from above, and wherein an original-mounting surface facing said input means is formed at the upper surfaces of said sheet-feeding tray and said sheet-discharging tray disposed at the locking positions.

* * * * *

UNITED STATES PATENT AND TRADEMARK OFFICE
CERTIFICATE OF CORRECTION

PATENT NO. : 5,764,385

DATED : June 9, 1998

INVENTOR(S) : ATSUSHI OHYAMA

It is certified that error appears in the above-identified patent and that said Letters Patent is hereby corrected as shown below:

Item [73] ASSIGNEE:

"Japan" should read --Tokyo, Japan--.

Item [57] ABSTRACT:

"an" should read --on--.

COLUMN 4:

Line 21, "origin-al-mouting" should read --original-mounting--.

COLUMN 5:

Line 64, "rably" should read --ably--.

COLUMN 8:

Line 49, "BE/B4" should read --B5/B4--.

COLUMN 9:

Line 33, "Next,"..."" should read --¶ Next,.....--.

UNITED STATES PATENT AND TRADEMARK OFFICE
CERTIFICATE OF CORRECTION

PATENT NO. : 5,764,385

DATED : June 9, 1998

INVENTOR(S): ATSUSHI OHYAMA

Page 2 of 2

It is certified that error appears in the above-identified patent and that said Letters Patent is hereby corrected as shown below:

COLUMN 11:

Line 14, "revolution" should read --revolutions--.

COLUMN 21:

Line 10, "are" should read --is--; and
   Line 67, "D" should be deleted.

COLUMN 23:

Line 33, "rotatable" should read --rotatably--.

COLUMN 26:

Line 2, "rotatable" should read --rotatably--; and
   Line 41, "rotatable" should read --rotatably--.

Signed and Sealed this

Twentieth Day of April, 1999

Attest:

Q. TODD DICKINSON

*Attesting Officer*         *Acting Commissioner of Patents and Trademarks*